US011120657B2

(12) United States Patent
Ma et al.

(10) Patent No.: US 11,120,657 B2
(45) Date of Patent: Sep. 14, 2021

(54) INTEGRATED LOCK MANAGEMENT AND SMART DEVICE CONTROL SYSTEM

(71) Applicant: Townsteel, Inc., City of Industry, CA (US)

(72) Inventors: Sybor Ma, La Puente, CA (US); Yongping Du, Shenzhen (CN)

(73) Assignee: Townsteel, Inc., City of Industry, CA (US)

( * ) Notice: Subject to any disclaimer, the term of this patent is extended or adjusted under 35 U.S.C. 154(b) by 0 days.

(21) Appl. No.: 16/568,641

(22) Filed: Sep. 12, 2019

(65) Prior Publication Data

US 2020/0327758 A1    Oct. 15, 2020

Related U.S. Application Data

(60) Provisional application No. 62/832,700, filed on Apr. 11, 2019.

(51) Int. Cl.
| | |
|---|---|
| *G07C 9/00* | (2020.01) |
| *G07C 9/29* | (2020.01) |
| *H04L 12/28* | (2006.01) |
| *H04L 29/08* | (2006.01) |
| *H04M 1/72409* | (2021.01) |

(52) U.S. Cl.
CPC .......... *G07C 9/00904* (2013.01); *G07C 9/29* (2020.01); *H04L 12/2807* (2013.01); *H04L 67/125* (2013.01); *H04M 1/72409* (2021.01)

(58) Field of Classification Search
CPC ... G07C 9/00904; G07C 9/29; H04L 12/2807; H04L 67/125; H04M 1/72527
See application file for complete search history.

(56) References Cited

U.S. PATENT DOCUMENTS

| | | | |
|---|---|---|---|
| 9,888,337 B1* | 2/2018 | Zalewski | H02N 11/002 |
| 10,142,122 B1* | 11/2018 | Hill | H04L 12/2807 |
| 10,187,773 B1* | 1/2019 | Zalewski | H04W 76/10 |
| 10,412,811 B1* | 9/2019 | Siminoff | H05B 47/155 |
| 10,582,358 B1* | 3/2020 | Zalewski | H04L 67/10 |
| 10,643,412 B1* | 5/2020 | Yang | G07C 9/00571 |
| 2008/0012683 A1* | 1/2008 | Ito | G07C 9/00817 |
| | | | 340/5.22 |
| 2011/0025459 A1* | 2/2011 | Denison | G07F 7/1025 |
| | | | 340/5.51 |

(Continued)

*Primary Examiner* — Joseph H Feild
*Assistant Examiner* — Rufus C Point
(74) *Attorney, Agent, or Firm* — Eric W. Cernyar; James W. Huffman

(57) ABSTRACT

An integrated lock management and smart device control system comprises lock controllers configured to authenticate lock management system (LMS) credentials and also act as a hub for a collection of smart devices. The system also comprises a guest app that can receive and store an LMS credential or a functional derivative thereof and use the credential to unlock an entrance. The guest app also provides smart device controls. When these are selected, the guest app issues a command to the lock controller or an Internet gateway, backed by the LMS credential. After authenticating the LMS credential, the lock controller or gateway transmits a command to the smart device that is backed by a configurable smart device credential. Guest control of the smart devices is terminated by disabling the LMS credential.

16 Claims, 18 Drawing Sheets

(56) References Cited

U.S. PATENT DOCUMENTS

| | | | |
|---|---|---|---|
| 2012/0157079 A1* | 6/2012 | Metivier | G07C 9/00182 |
| | | | 455/420 |
| 2015/0127712 A1* | 5/2015 | Fadell | G08B 25/008 |
| | | | 709/202 |
| 2016/0098755 A1* | 4/2016 | Silvestro | G06Q 30/0258 |
| | | | 705/14.56 |
| 2016/0260274 A1* | 9/2016 | Kuenzi | E05B 41/00 |
| 2016/0344091 A1* | 11/2016 | Trani | G07C 9/20 |
| 2017/0311161 A1* | 10/2017 | Kuenzi | H04L 9/3213 |
| 2017/0346634 A1* | 11/2017 | Hoyer | G06F 21/32 |
| 2018/0019889 A1* | 1/2018 | Burns | H04L 12/4625 |
| 2019/0121522 A1* | 4/2019 | Davis | G06F 3/04815 |
| 2020/0092676 A1* | 3/2020 | Kuenzi | G06F 21/34 |

* cited by examiner

| File Options View Help | | | | | | | |
|---|---|---|---|---|---|---|---|
| Panel | Login | Logout | Exit | New | Out | Add | Edit |

Rooms ─142

| RoomNo | Type | Keys | Building | CheckInTime | CheckOutTime |
|---|---|---|---|---|---|
| 0111 | Apple | 2 | 001 | 19/8/20 18:21 | 19/8/22 11:00 |
| 0112 | Samsung | 0 | 001 | | |
| 0113 | Samsung | 0 | 001 | | |
| 0114 | Samsung | 0 | 001 | | |
| 0115 | Samsung | 0 | 001 | | |
| 0116 | Google | 1 | 001 | 19/8/18 16:55 | |
| 0117 | Google | 0 | 001 | | |
| 0118 | Google | 0 | 001 | | |

─144

Check In
Check Out
Additional Key
Multi-Room Check In
Force Check Out
Checkout Card
Edit Guest Key 2019-08-21 15:55:48 System initialized
2019-08-21 15:55:48 Encoder is ready
2019-08-21 15:59:13 Room 113 selected
2019-08-21 15:59:24 Visa card swiped
2019-08-21 16:59:37 Card accepted; check In room 113
2019-08-21 17:00:15 Token encoded

CheckIn for 0113
Please Put Key on Encoder and Press Start

Guest Name

─148

Please Confirm

CardType : Guest Key
CardNo    : 190C200
Building  : 001
RoomID    : 0113
Start Time : 19/08/21 16:59:42
End Time  : 19/08/22 11:00:00

YES   NO

Operation

| Name | Samsung0Ec7 |
|---|---|
| CheckIn | 19/08/21 |
| Time | 16:59:42 |
| CheckOut | 19/08/22 |
| Time | 11:00:00 |

PAYMENT INFO
SAVE  EXIT

Fig. 9

Fig. 18 — Program Community Device Access

- Accessible Start: 8:00am — 243
- Accessible End: 8:00pm — 244
- Set Hours
- Require access token? Y ● N ○ — 245
- Allow card? Y ● N ○ — 247
- Allow phone? Y ● N ○ — 249
- Submit

242

Fig. 19 — Program Lock Device

Room/Suite C231
Lock Type: Samsung
Capabilities: Card, Phone
Comm Mode: WiFi, Bluetooth

- Enable Phone Access? Y ● N ○ — 253
- Enable Invites? Y ● N ○ — 254
- Enable Wifi Comm? Y ○ N ● — 255
- Enable Bluetooth? Y ● N ○ — 256
- Program Lock Device
- Deregister Lock Device

252

Fig. 20 — Program Camera

Enter Device Serial No.
263 — AH629B210 — 264
Or Scan QR Code

- Record Entries/Attmps Y ● N ○ — 265
- Record Exits Y ● N ○ — 267
- Let guests see videos Y ● N ○ — 269

262

Fig. 21 — Manage Gateway

- IP Address of Gateway: 192.168.0.1 — 273
- Username: Admin — 274
- Password: ********* — 275
- Select Camera — 276
  - B3SWCorner-connected ▼
  - B3SECorner-notconnected
  - Add new camera
- Camera Settings
  - Link Camera? Y ● N ○ — 277
  - Record Entries/Attmps Y ● N ○ — 278
  - Record Exits Y ● N ○ — 279
  - Let guests see videos Y ● N ○ — 280
- Submit
- Retrieve Audit Trail

272

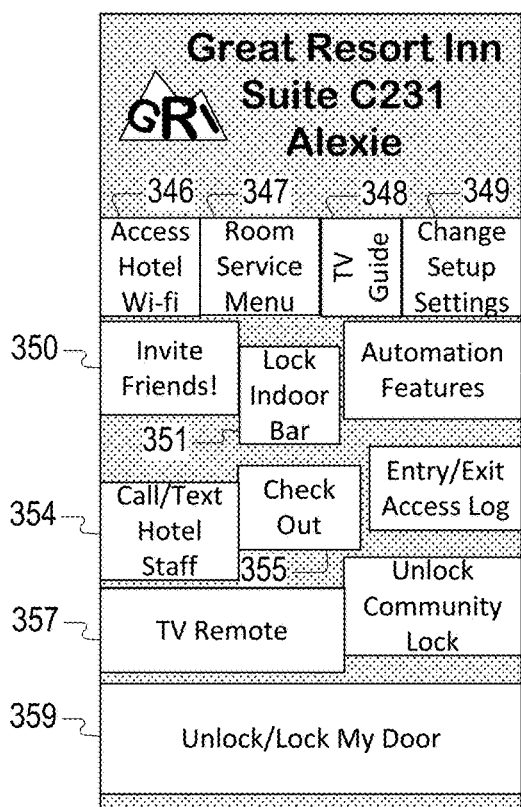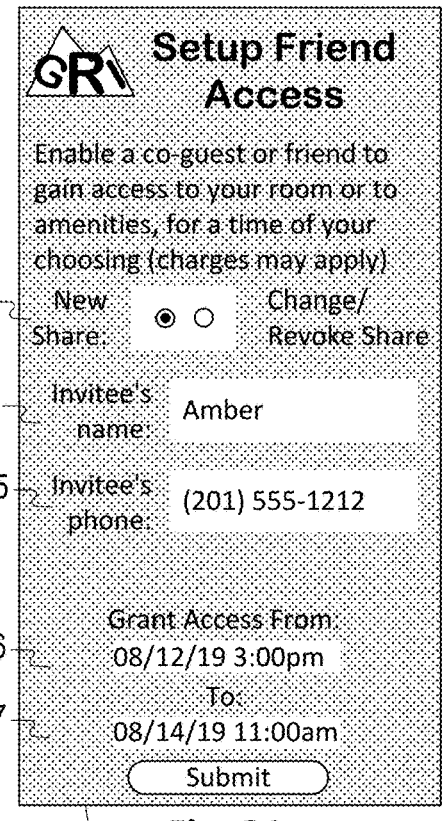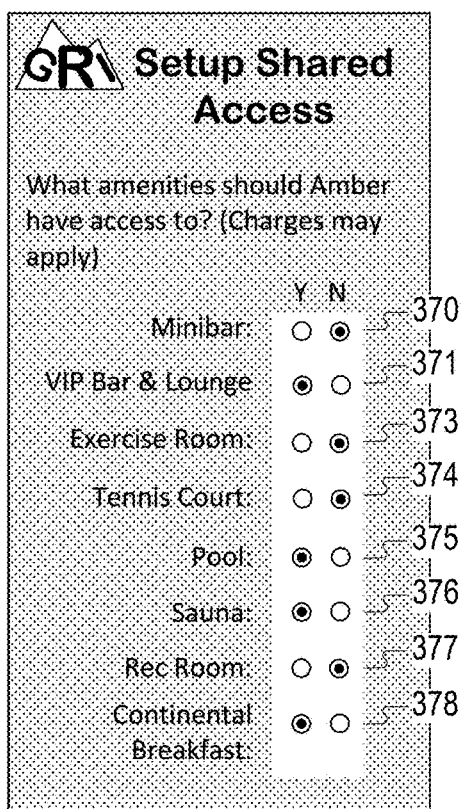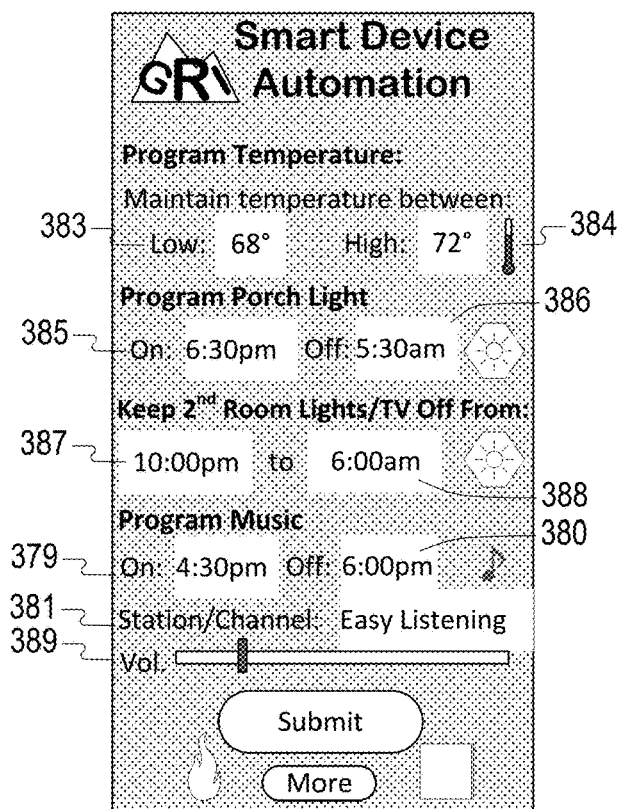
Fig. 30
Fig. 31
Fig. 32
Fig. 33

Fig. 34 — Access Log Suite C231

2019-08-20

- 22:28:37 • Alexie granted access to Amber
- 22:05:19 • Alexie unlocked door C231 with app
- 22:02:37 • Alexie provisioned phone with keys
- 15:43:51 • Alexie unlocked door C231 with key
- 15:36:05 • Card made for Alexie for C231

392 — Fig. 34 (393)

Fig. 35 — Check Out

Check out is at 11:00 a.m. Monday, August 12

Would you like to:  Y  N

- 403 — Leave a Review?  ●  ○
- 404 — Review room charges?  ●  ○
- 405 — Get emailed receipt?  ○  ●
- 406 — Request a later checkout?  ●  ○
- 407 — Extend your stay?  ●  ○
- 408 — Limit your stay?  ●  ○
- 409 — Check out now?  ●  ○

Submit

Hi Amber, I'm inviting you to a slumber party with me and some friends tonight. We're in Suite C231 at the Great Resorts Inn. Click the link below to download an app. It will let you freely enter and exit the suite. It will also entitle you to a free margarita at the VIP bar and lounge!

GRI Friend App — 413

8/12/2019 3:35 pm

Thank you! I can't wait to see you!

412 — Fig. 36

Fig. 37 — Friend App You Are Invited! Suite C231 Create Account

- Name: _____ — 423
- Email: _____ — 424
- Password: _____ — 425
- Credit Card #: _____ — 426
- Exp Date: _____ — 427

Create Account

INTEGRATED LOCK MANAGEMENT AND SMART DEVICE CONTROL SYSTEM

RELATED APPLICATIONS

This application claims the benefit of and hereby incorporates by reference Provisional Application No. 62/832,700, entitled "Property Management and Automation System," filed Apr. 11, 2019.

FIELD OF INVENTION

This application relates to property management systems, and more particularly, to property management systems that provide access to guest rooms or properties through physical tokens such as keycards and key fobs.

BACKGROUND

Property management systems (PMS) that provide hotel guests access to guest rooms through physical tokens such as keycards and key fobs are well known. Some of the earliest keycard systems used punch cards with a series of spatially distributed apertures that, when inserted into a keycard slot of a guest room door lock, would unlock the door. Similar systems using cards with spatially distributed raised bumps or dimples were also in common use.

These systems were succeeded by the use of programmable physical tokens in the form of magnetic stripe cards. These are now being succeeded by cards or tokens that communicate by means of radio-frequency identification (RFID), near field communication (NFC), or Bluetooth.

Typically, PMSs involve a software application paired with a keycard programming device that enable a hotel clerk to assign a room number to a tenant and program keycards that provide access to the room.

A more recent development is home automation—using an app on a handheld digital device such as a smart phone to control lights, fans, TVs, air conditioning, and other Internet of Things (IoT) devices or smart appliances and devices within a person's house.

But to the Applicant's knowledge, there is no commercially available system that combines a keycard-based PMS with a home automation system.

WO 2013/049730 to Fingi Inc., which is incorporated by reference for its use in describing and enabling non-novel components of one or more implementations of the present invention, discloses a non-keycard-based PMS in which guests can use an app downloaded onto their smartphones to access home automation services and optionally also unlock guest rooms. Fingi does not integrate the disclosed system with the use of physical tokens such as keycards to unlock the rooms. Disadvantageously, a hotel cannot be upgraded with this system without all of the keycard-based door locks being replaced.

U.S. Patent Pub. No. 2017/0345237 to Kuenzi, which is incorporated by reference for its use in describing and enabling non-novel components of one or more implementations of the present invention, discloses a PMS in which locks have both a physical card reader and a wireless signal reader in order to accommodate both physical key cards and credentialed smartphones. See ¶ 59. Kuenzi does disclose one type of integration with a keycard system. A "hard-key dispenser unit 98" is provided to produce a physical key card—if the guest wants one—by accessing the appropriate credentials from a smartphone. See ¶ 62. This is inconvenient for a guest at a hotel that hasn't budgeted replacement of all of its keycard-based door locks, or who just wants the keycard without having to bother with a smartphone app to gain access to their room. Kuenzi also does not mention using the credentialed smartphone to control home automation features.

Also, neither Fingi nor Kuenzi combine a keycard-based PMS with a home automation system.

SUMMARY

Embodiments of an integrated lock management and smart device control system ("integrated system") is provided. In one embodiment, the integrated system comprises a lock management system (LMS), a smart device collection (LDS), and a hub. The LMS includes a database and an LMS program that enables a user to enter a command to generate an LMS credential. The LMS credential enables a guest to unlock an entrance to an access-controlled property. The SDC comprises one or more smart devices on or in the access-controlled property or a premises of the access-controlled property. The smart devices are controllable, schedulable, and/or configurable through use of individual smart device credentials or a common SDC credential. (An SDC credential provides secure access to multiple smart devices in the LDS). The hub comprises a second program that configures the hub to receive a guest-issued command backed by the LMS credential that is directed to a selected smart device. The LMS is configured by the second program to respond to a successful authentication of the LMS credential by transmitting the command or a functional equivalent of the command, backed by the individual smart device credential or an SDC credential, to the selected smart device.

In one embodiment, the integrated system further comprises a lock controller installed in a lockset that controls access to the entrance of the access-controlled property, wherein the hub is integrated into the lock controller. In a multi-unit property embodiment, the integrated system comprises a plurality of lock controllers installed in a plurality of locksets at an accommodation of which the access-controlled property is a part; wherein issuance and distribution of LMS credentials for the plurality of lock controllers is centrally controlled through the LMS. Each unit of the multi-unit property has an SDC that is controlled by a hub integrated into the lock controller of the lock for the unit.

In an elaboration of the aforementioned embodiments, the integrated system further comprises a guest app that, when executed on a mobile phone belonging to the guest, provides the guest with an interface command to unlock the entrance to the access-controlled property. The guest app also provides an interface command to turn the selected smart device on or off, schedule the selected smart device, and/or configure the selected smart device.

In another elaboration of the aforementioned embodiments, the guest app also provides selectable commands for generating LMS access tokens and/or LMS invitee credentials for invitees and/or household members of the guest. A further implementation of the guest app provides selectable commands for regulating access to the one or more smart devices by the invitees and/or household members of the guest.

In another elaboration, the LMS further comprises a token encoder such as a card encoder. The token encoder encodes a token with the LMS credential and is communicatively coupled to the digital processor on which the LMS program is executed, so that the LMS program can issue an instruction to the digital encoder to encode a token with the LMS credential. In one implementation, the token or a sleeve for the token includes a scan code for downloading the first app.

In further elaborations, the LMS program furnishes the user with a command to disable the LMS credential to prevent further entry by the guest into the access-controlled property. Alternatively or in addition, the LMS program furnishes the user with a command to create a block card that bears a command, communicable to the lockset, to disable the LMS credential.

In another embodiment, a system is provided that enables a guest to control both an accommodation entrance lock and smart devices installed in or on the accommodation using two independently issued credentials. The system comprises a lock controller that is configured to store a smart device collection credential and to receive a first command, backed by a lock management system (LMS) credential, to control, schedule, and/or configure a selected smart device. The lock controller is also configured to authenticate the LMS credential and responsively issue a second command, backed by the smart device collection credential, to the selected smart device in order to control, schedule, and/or configure the smart device.

The system may also comprise an LMS that issues the LMS credential. The system may also comprise a smart phone app for guests. The smart phone app is configured to utilize the smart phone's display, encryption and decryption circuitry, memory, and wireless communication means to receive the LMS credential issued by the LMS, issue a command to control, schedule, and/or program a selected one of the smart devices, and back the command with the LMS credential which is integrated with or accompanies the command.

In yet another embodiment, a method is provided for integrating lock management and smart device control in a hospitality accommodation having a plurality of abodes for guests. Using an LMS, a guest app is provided to the guests, and LMS credentials are issued to the guests, to access their respective abodes. The guest app provides a first process for transferring their respective LMS credentials to their respective phones and a second process for controlling, scheduling, and/or programming a selected smart device on or in the guests' abodes, backed by their respective LMS credentials. The hub is preconfigured to receive a guest-issued, LMS-credential-backed smart device command from the guest app. The hub is also preconfigured to respond to a successful authentication of the LMS credential by transmitting the command or a functional equivalent of the command, backed by a smart device credential, to the selected smart device.

In a preferred implementation, the guest app provides selectable commands to unlock the entrance to the guest's abode and to turn the selected smart device on or off, schedule the selected smart device, and/or configure the selected smart device. In an optional implementation, the guest app also provides selectable commands for generating LMS access tokens and/or LMS invitee credentials for invitees and/or household members of the guest. The guest app may also provide selectable commands for regulating access to the one or more smart devices by the invitees and/or household members of the guest.

In another preferred implementation, the LMS is equipped and utilized to disable the LMS credential to prevent not only further entry by the guest into the access-controlled property, but also further access to the smart devices.

It should be understood that the invention is not limited by the various and alternative features set forth in the summary, but instead only by the express recitation of those features in the claims. Also, other systems, devices, methods, features, and advantages of the disclosed system and methods will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure can be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, exchange, or replace some of the features depicted; and embodiments that include features not illustrated in the drawings. Therefore, it should be understood that there is no restrictive one-to-one correspondence between any given embodiment of the invention and any of the drawings.

FIG. 8 illustrates an example of a lock management program check-in screen.

FIG. 9 illustrates an example of a lock management program dialog box and confirmation box for checking a guest in and generating a credential.

FIG. 18 illustrates a community lock programming screen of the administrative app.

FIG. 19 illustrates a follow-up lock programming screen of the administrative app.

FIG. 20 illustrates a camera programming screen of the administrative app.

FIG. 21 illustrates a gateway management screen of the administrative app.

FIG. 30 illustrates an opening post-login panel screen of the guest app that replaces the screen of FIG. 27 if the guest configures their phone to unlock their lock.

FIG. 31 illustrates a friend setup screen of the guest app.

FIG. 32 illustrates a setup-shared-access screen of the guest app.

FIG. 33 illustrates a smart device/home automation setup screen of the guest app.

FIG. 34 illustrates a log screen of the guest app.

FIG. 35 illustrates a check-out screen of the guest app.

FIG. 36 illustrates a text that is partially generated by the guest app directed to an invited friend.

FIG. 37 illustrates a create account screen of one embodiment of a friend app.

DETAILED DESCRIPTION

In describing preferred and alternate embodiments of the technology described herein, various terms are employed for the sake of clarity. Technology described herein, however, is not intended to be limited to the specific terminology so selected, and it is to be understood that each specific element includes all technical equivalents that operate similarly to accomplish similar functions. Where several synonyms are presented, any one of them should be interpreted broadly and inclusively of the other synonyms, unless the context indicates that one term is a particular form of a more general term.

Specific quantities (e.g., spatial dimensions) can be used explicitly or implicitly herein as examples only and are approximate values unless otherwise indicated. Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges can independently be included in the smaller ranges is also encompassed within the invention, subject to any specifically excluded limit in the stated range. Where the stated range includes one or both of the limits, ranges excluding either both of those included limits are also included in the invention.

In the specification and claims, conventionally plural pronouns such as "they" or "their" are sometimes used as non-gendered singular replacements for "he," "she," "him," or "her" in accordance with emerging norms of pronoun usage. Also, although there may be references to "advantages" provided by some embodiments, other embodiments may not include those same advantages, or may include different advantages. Any advantages described herein are not to be construed as limiting to any of the claims.

FIGS. 1-40 illustrate various embodiments of an integrated lock management and smart device control system 10 for controlling access to a room or facility on a multi-unit facility such as a hotel, Airbnb® lodging, or vacation rental and for accessing smart devices and amenities in the room, facility, or on the premises. The integrated lock management and smart device control system 10 comprises one or more locks/locksets 61-65, 500 each equipped with a lock controller, a lock management system (LMS) 11 including a lock management program (LMP) 33, a physical token 50, a token encoder, and a mobile phone app (which may also be configured to run on other digital computer devices).

The Lock Management System and Program

Figure 1:
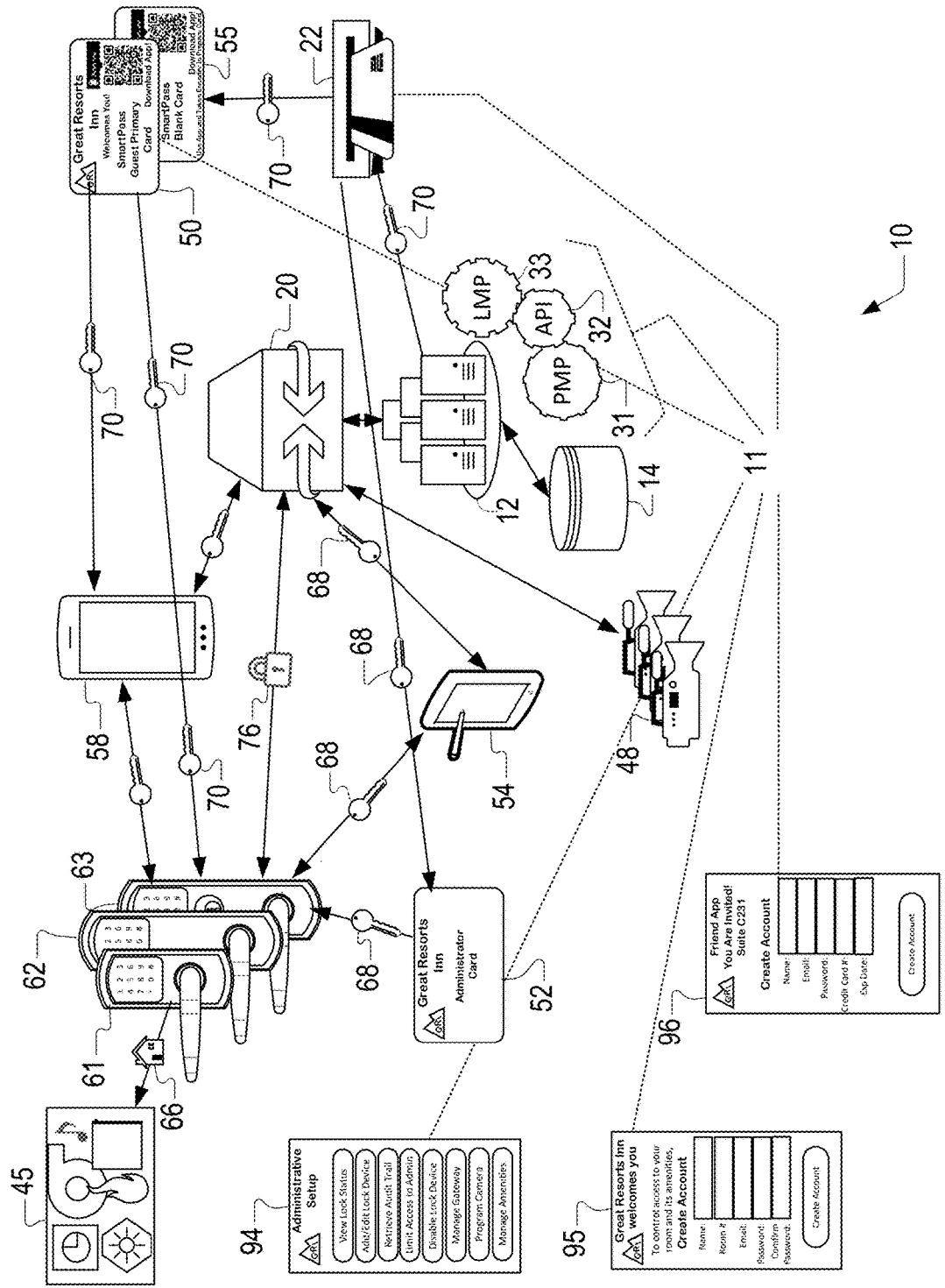
FIG. 1 illustrates one embodiment of an integrated lock management and smart device control system for managing property reservations and cancellations, managing credentials for accessing the property and amenities, and accessing home automation features.

FIG. 1 illustrates the integrated lock management and smart device control system 10. The system 10 comprises a property management system (PMS), the LMS 11, a database 14, at least the electronic controllers for the locks 61-65 (and optionally also the locks themselves), (optionally) controllers 80 (FIG. 4) for various amenities and home automation/IoT devices 42, (optionally) surveillance cameras 48, and (optionally) a network gateway 20 and network that interconnects the devices 42 and 48. The LMS 11 also includes administrative, guest, and friend apps 94-96 that run on mobile digital devices 54 and phones 58.

The LMS 11 comprises the token encoder 22, the token cards or fobs 50, 52, the LMP 33, and the shared hardware upon and through which it operates. This includes the server and/or cloud-based hardware 12 in which the LMP 33 is stored and on which it executes and the communications hardware (if any) that links it with the lock and amenity controllers 80 of a premises. Much or all of this hardware may also be shared by the PMS.

The LMP 33 comprises a program of instructions residing on a non-transitory computer medium such as a solid storage disk (SSD) or server RAM. When executed on a central (i.e., system-managing) local or cloud-based computer or computer network such as the local or cloud-based server 12, the LMP 33 remotely controls access to one or more accommodations, facilities, and/or amenities. The LMP 33 also generates LMS guest credentials 70 and optionally also corresponding credential verification codes 76. The LMP 33 sends the LMS guest credentials 70 to the token encoder 22, which encodes the LMS guest credentials 70 onto physical tokens 50 for guests. The physical tokens 50 enables them to access accommodations, facilities, and/or one or more of the amenities. The physical token 50 is a magnetic stripe card, RFID tag, non-battery-powered memory stick or other equivalent device that carries the guest's access credential 70. In an embodiment in which the lock controllers 80 and server communicate on a common network, the LMP 33 also causes credential verification codes 76 corresponding to the guest's access credentials 70 to be sent to corresponding lock and/or amenity controllers 80 during check-in.

It will be appreciated that many different implementations are possible and contemplated. In one implementation, the credential 70 and the credential verification code 76 are the same. In another embodiment, the credential 70 and credential verification code 76 are the public and private keys, respectively, of a cryptographic public/private key pair. In yet another implementation, the credential 70 is a one-time passcode (OTP) or a plurality of one-time passcodes that expire(s) after a preprogrammed time—eliminating the need to purge (or even use) a credential verification code 76. In a further implementation, the lock controller 80 generates a derivative credential 71 and/or derivative credential verification code from the credential 70 and/or credential verification code 76.

A guest can download a guest app 95, obtain the credential 70, and present the credential 70 to the lock controller 80 to access smart devices 42 associated with the guest's assigned building, abode, or room. The guest can either discover the smart devices 42 with the app 95 or download a smart device configuration file that lists the available smart devices 42. In one embodiment, the controller 70 is configured to act as a hub or gatekeeper 41 for the smart devices 42, and when a guest, through their phone 58, presents the credential 70 to the lock controller, the portion of the controller 70 configured as a hub/gatekeeper 41 transmits an appropriate smart device collection (SDC) credential 66 to the user-designated smart device. In an alternative embodiment, the SDC credential 66 is the same credential 70 used to access the building/abode/room's smart devices 42 and thus the guest's phone 58 can communicate with the smart devices 42 directly.

When or after the guest checks out, the LMS 11 remotely purges, disables, resets, and/or replaces the credential verification codes 76, if any, and/or the credentials 70 themselves. Alternatively, the LMS 11 remotely deletes the users and/or reset the passwords or other credentials associated with the group of smart devices 42 associated with the rental unit. It may also, or in the alternative, reset the home automation group so that the guest can no longer access the smart devices 42 and then rebuild the smart device configuration (i.e., the hierarchy of smart devices 42 for the rental unit, such as "home," "zone" or "room" to which the smart devices 42—including the lock 61-65 for the rental unit—are assigned). In yet another alternative embodiment, a manager or cleaning crew person uses "block" cards to individually purge, disable, reset and/or replace the credentials 70 and/or credential verification codes 76, if any.

The term "guest" is used herein for convenience, not for limitation. For example, a guest may refer to a long-term tenant, because the principles of this invention are not limited to hotels and short-term rentals. Likewise, a guest to be one who has A guest could be any tenant, leaseholder, lodger, dweller, resident, inhabitant, occupant or possessor who seeks to practice the principles of the invention(s) contained within this description.

FIG. 8 illustrates a room assignment screen 140 of one embodiment of the LMP 33. A scrollable tabbed folder or list 142 presents room numbers, the lock credential type (e.g., Apple, Samsung, Google), the number of keys issued, the building number, and the check-in and check-out times. An operator starts the process of reserving a room for a guest by selecting a row associated with a room number. The LMP 33 responds by presenting a submenu 144 with several options, such as "Check In," "Additional Key," and "Multi-Room Check In." The operator selects "check in" and the LMP 33 responsively presents one or more dialog boxes 146 (FIG. 8) and confirmation boxes 148 for entering and confirming the guest's name, the check-in and check-out dates (the times are filled in by default but can be edited), and payment information. The LMP 33 similarly supports other operations—some of which may be traditionally performed by the PMS—including checking out, forcing a checkout, editing a guest key, and—assuming that one or more of the locks is not equipped to be remotely commanded to purge a credential verification code—creating a checkout or block card that causes the lock controller 80 to purge a credential 70 or credential verification code 76.

In one implementation, the LMP 33 is configured to interact with an application programming interface (API) of any of a plurality of new and legacy property management programs 31 (PMPs). A PMP 31 comprises an independently executable program of instructions residing on a non-transitory computer medium such as SSD or RAM. When executed, the PMP 33 manages reservations, cancellations, and check-ins; it is the logical core of the PMS. Each PMP 33 also communicates with a database 14, storing and retrieving reservation, check-in, check-out, payment, accounting, logging, and other information associated with running the accommodation. The LMP's generation of LMS guest credentials 70 and corresponding credential verification codes 76 is coordinated with the PMP's management of check-ins. The LMP's purge of credential verification codes 76 is coordinated with the PMP's management of check-outs. In one implementation, the LMP 33 replaces the PMP's check-in interface with the check-in page shown in FIG. 5, while the LMS 11 continues to harness the PMP's database, card payment, accounting, and other utilities.

In another implementation, the LMP 33 is incorporated into an upgrade package for a PMS 31, which includes a plurality of lock controllers 80. In yet another implementation, the LMP 33 includes or is packaged with a PMP 31. And in a further implementation, the LMP 33, PMP 31, lock controllers 80, amenity controllers 80, server 12, and one or more gateways 20 are provided as part of a package. It will be understood that industry labeling of lock and property management systems is not precise, and there may be considerable overlap. What one would refer to as an LMS, another may refer to as a PMS, and vice versa.

Figure 2:
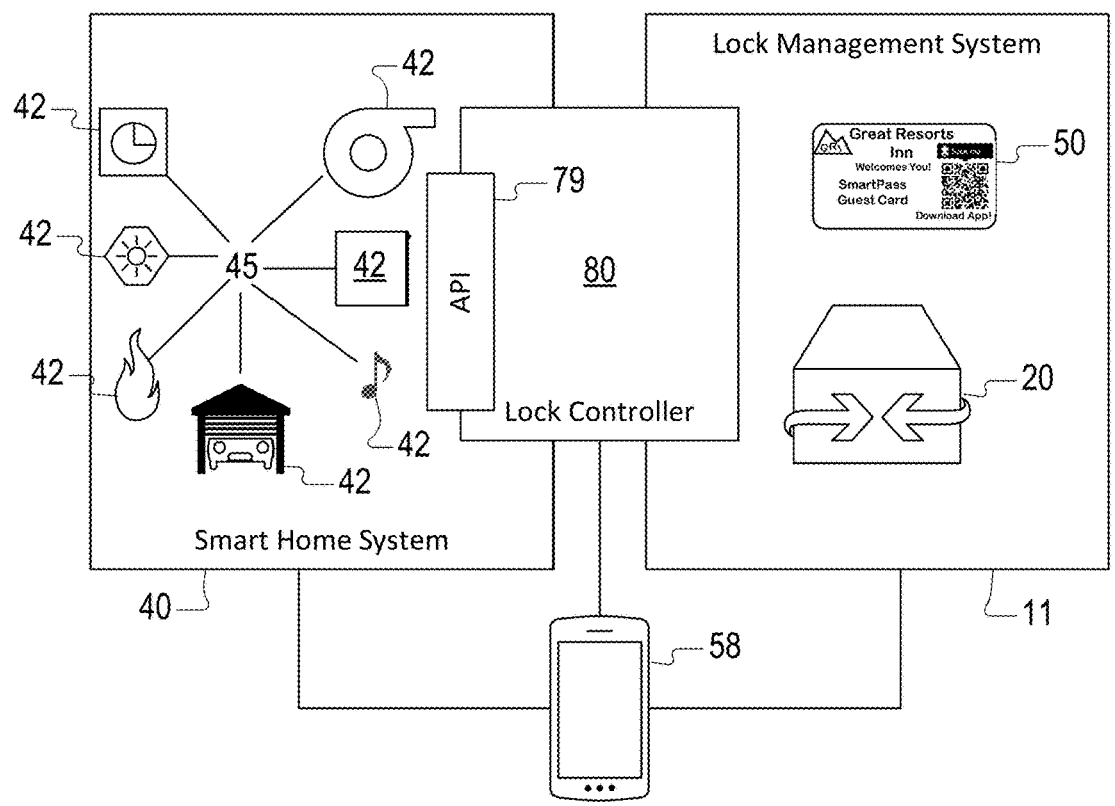
FIG. 2 is a block diagram illustrating one embodiment of a lock controller that integrates a smart device system with a lock management system.
Figure 3:
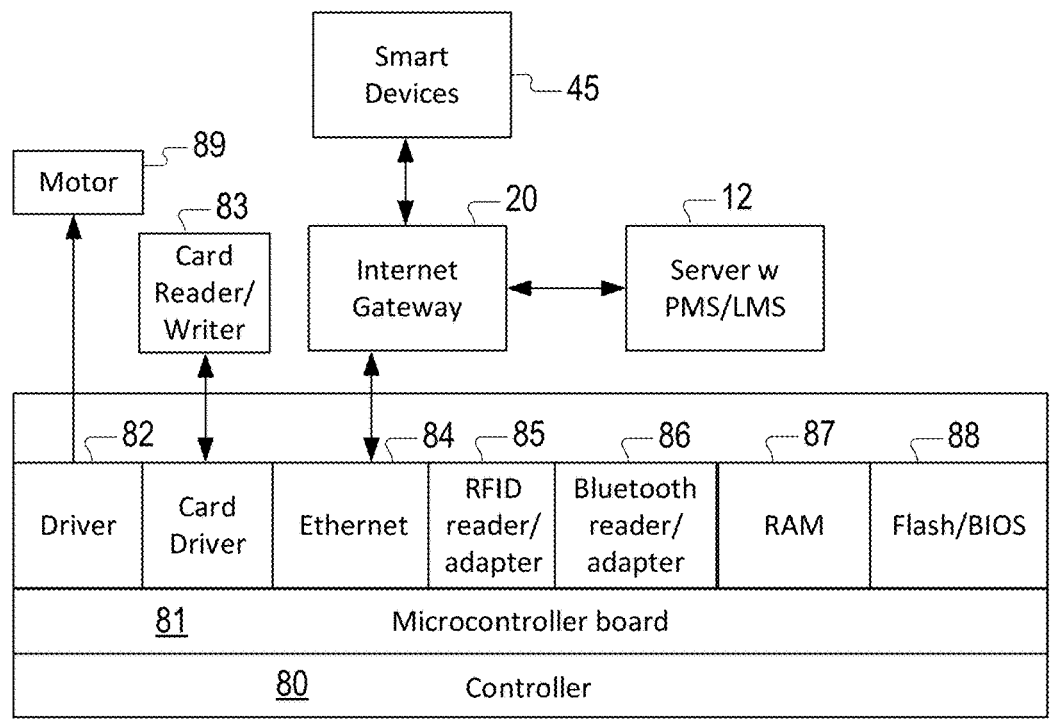
FIG. 3 illustrates one embodiment of a lock controller.
Figure 12:
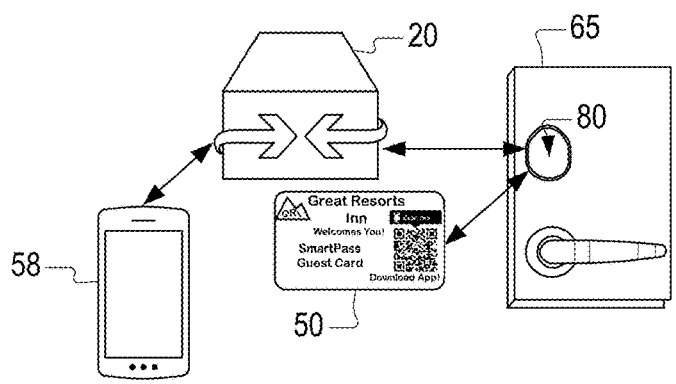
FIG. 12 illustrates a preferred relationship between a credential-carrying physical token, a lock controller that acquires the credential from the token, and a guest phone that acquires the credential from the lock controller.
Figure 13:
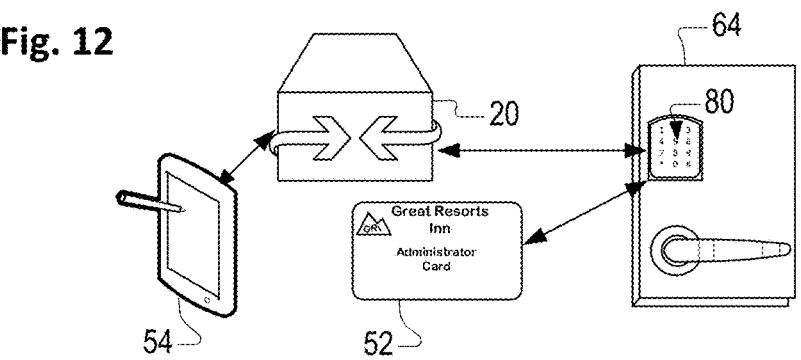
FIG. 13 illustrates a relationship between another physical token used to initially transport an administrative credential, a lock controller, and a mobile device used to configure the lock controller and its network access configuration.
Figure 14:
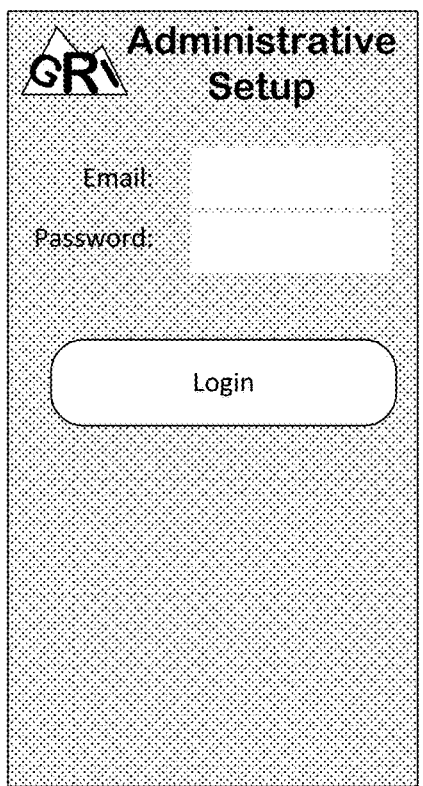
FIG. 14 illustrates a login screen of one embodiment of an administrative app for configuring lock controllers, cameras, and gateways and for retrieving audit trails.

FIGS. 12 and 13 are simplified diagrams of significant features of the integrated lock management and smart device control system 10. FIG. 2 illustrates the relationship between the physical token 50 used to initially transport the credential 70, the guest phone 58 later used to carry the credential 70, and the lock controller 80 used to complete a "handshake" that transfers the credential 70 from the physical token 50 to the lock controller 80 to the guest's phone 58. FIG. 3 illustrates the relationship between another physical token 52 used to initially transport an administrative credential 68, a mobile device 54 used to configure the lock controllers 80 and their network access configurations, and the lock controller 80 again used to complete a "handshake" that transfers the administrative credential 68 from the physical token 50 to the lock controller 80 to the mobile device 54.

It is briefly noted that FIGS. 1 and 12-13 illustrate five non-limiting examples of locksets 61-65 that are compatible with the integrated lock management and smart device control system 10. In some cases, the locksets provide alternative means of access, such as a key and/or a pin pad 501. The lockset 65 of FIG. 12 requires use of the physical token 50, 52 or a mobile device 54, 58.

The Lock Controller

Figure 4:
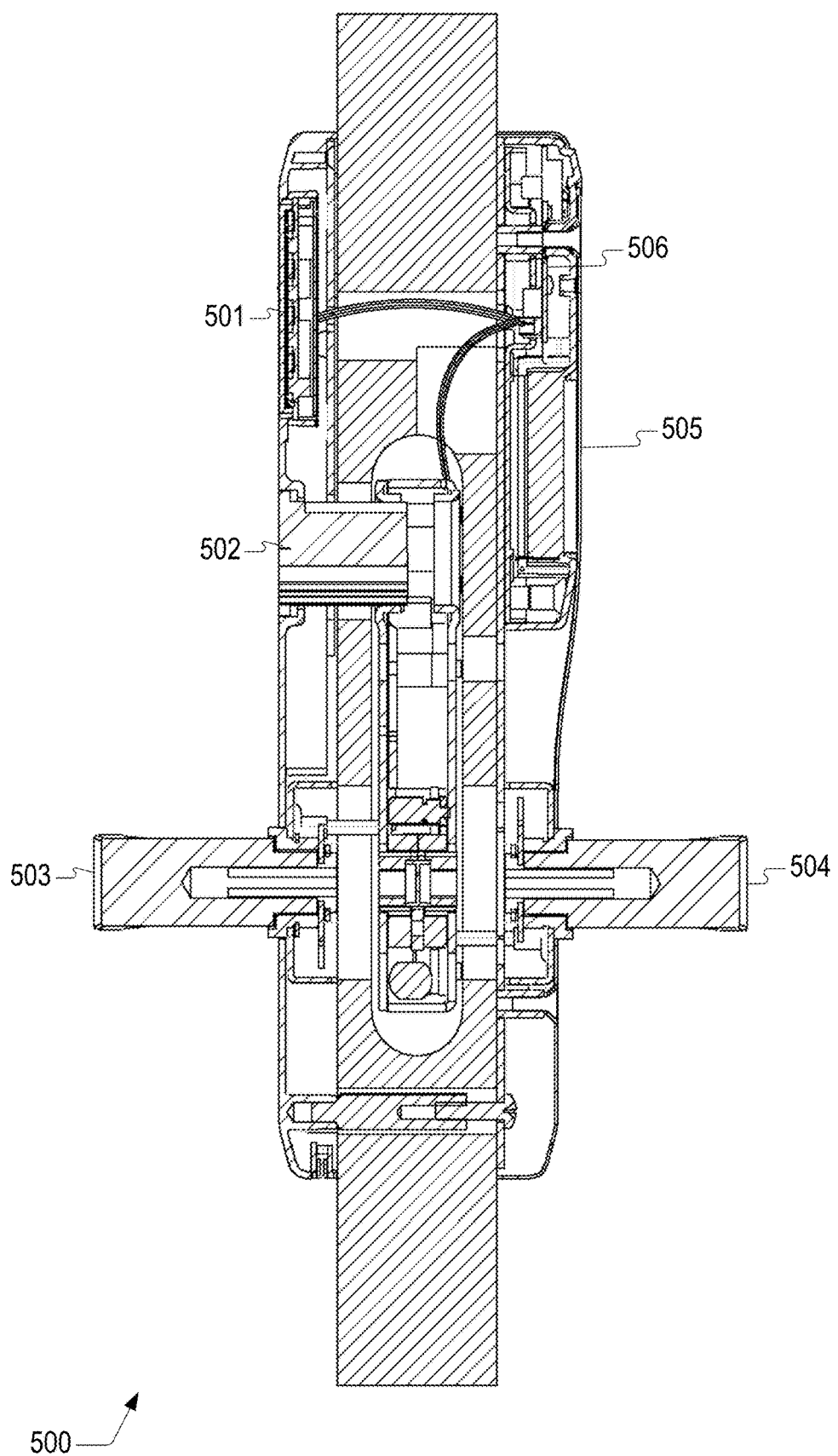
FIG. 4 is a cut-away of an installed lock assembly.

FIG. 4 is a cut-away illustration of one embodiment of a lockset or lock assembly 500 suitable for use with the LMS 11. The lockset 500 comprises a keypad 501, a key override 502, outside handle 503, inside handle 504, a battery holder 505, and a printed circuit board (PCB) 506. In this embodiment, the PCB 506 and its components are synonymous with the microcontroller board 81 81 and components 82-88 described in FIG. 3.

Each lockset 500 comprises a microcontroller board 81 (FIG. 3), a microcontroller (not shown) mounted on the microcontroller board 81, an optional card reader and/or writer 83 connected to the microcontroller board 81, an Ethernet adapter 84 (or an adapter for another networking protocol) mounted on the microcontroller board 81, an RFID reader 85, a reader/adapter 86 for Z-Wave, Bluetooth, or other communications means mounted on the microcontroller board 81, and random access memory (RAM) 87 and flash memory 88 mounted on the microcontroller board 81. The flash memory 88 stores BIOS, access records, user information, credentials 68, 70 and/or credential verification codes 76 and, in one embodiment, SDC credentials 66 and smart device group configurations. A motor driver 82 hosted in the flash memory 88 is operable to drive a lock motor 89 to lock or unlock the lockset. The Ethernet adapter 84 couples the lock controller 80 to a WiFi gateway 20, enabling a mobile phone 50, 52 to communicate via WiFi with the lock controller 80.

In other embodiments, the lockset 500 comprises combinations of fewer than all of the elements illustrated in FIG. 3 and various combinations of various elements of FIG. 3 with components enabling other types of communications means.

In one embodiment, each lock controller 80 is provided with a unique universally unique identifier (UUID) or other code for programming all user codes, keycards/fobs, and system settings. In one implementation, the UUID is permanently associated with the lock controller 80 and cannot be changed through the LMP 33 or the administrative app 94, but only (if at all) through a BIOS upgrade.

The card reader 83 and/or RFID reader or adapter 85 configures the lock controller 80 to receive a credential 68, 70 from an optionally non-battery-powered physical token 50, 52 such as a magnetic strip card, when swiped, or a RFID token, when waved in proximity to the lockset 61-65, 500. Alternatively, entering a temporary pin number on a lockset 61-63, 500 with a keypad 501 while holding the key card or fob in proximity to the lockset 61-63, 500 causes a transfer of credentials to the physical token 50. In one implementation, after this transfer is complete, the option to access the lockset 61-63, 500 via the pin number is removed.

In one embodiment, the card (or other token) reader 83 also functions as a card (or other token) writer/encoder 22. When guests check in, they are provided with one or more primary or master credential-carrying tokens 50 along with one or more blank cards 55. Guests can use the card reader/writer 83 along with the guest app 95 to encode the blank cards 55 (and with customizable access privileges) to distribute to their children, friends, etc. For locksets 500 that lack a card reader/writer 83, a separate card or token writer 22 may be provided in the lobby, in hallways, or in any other convenient location to enable guests to encode blank cards 55.

The lock controller 80 is also configured to authenticate the credential 68, 70 after it reads it from the token 50, 52. In one embodiment, the lock controller 80 is preprogrammed with a credential verification code 76 or authentication process that, when used in accordance with a standard decryption algorithm, is operable to analyze and determine whether or not a given credential 68, 70 is authorized for that lock controller 80. In another embodiment, a LMP 33—a software program that inter-operates with a PMS 31 to generate, destroy, and manage access credentials and remotely control access to one or more accommodations, facilities, smart devices 42, and/or amenities—generates a credential 70 together with a credential verification code 76 when a guest who has paid for a room, facility, building, or amenity accommodation is ready to take possession or make use of that accommodation. The lock controller 80 is connected to a network such as a local area network (LAN). The LMS 11 transfers the credential verification code 76 to the lock controller 80 through the network.

After the lock controller 80 receives the credential 68, 70 from the token 50, 52, it compares, decrypts, and/or analyzes the credential 68, 70 (or a derivative 71 thereof) with or in conjunction with the lock verification code 76 (or a derivative thereof). If there is a match—e.g., a combination and/or derivation of the two generates a lock-opening value—then the lock controller 80 signals a motor driver 82, which in turn powers a motor 89, to unlock the lockset 61-65.

FIG. 2 illustrates one embodiment of a lock controller 80 that integrates the LMS 11 with a smart home system 40, which is a collection of smart devices—i.e., a smart device collection (SDC) 45—that are configured to operate through an integrated control system such as a smart home app. An SDC 45 may be access-controlled through a common SDC credential in order to prevent non-authorized users from accessing the SDC 40. The smart device collection refers the group of smart home devices 42—whether set up using an administrator card 52, set up by a guest using a guest app 95, or setup by other means—that are assigned to the guest's accommodations. Some of the smart home devices 42—such as those controlling lights, heating and air conditioning, etc., are guest-configurable. Amenity controllers that control access to community amenities may also be guest-configurable, but preferably only apply to the guest or the guest's invitees.

The lock controller 80 performs multiple roles. The first role its integration into the LMS 11. The second role is as a gatekeeper between the smart devices 42 and a guest with a guest app 95. In one embodiment, a guest gains access to the smart devices 42 by obtaining a credential 70, 71, or 72 from the lock controller 80. In another embodiment, the lock controller 80 acts as a hub 41 through which access to the smart devices 42 is regulated. To program or configure a smart device 42, the guest presents one or more of the credentials 66, 70, 71, and 72 to the lock controller 80 which then operates the smart device 42 through an API or communications platform 79 (e.g., Apple's Home Kit™ API, Samsung's SmartThings™ API, Amazon's Smart Home Skill™ API for Alexa-compatible devices, the "If This Then That" (IFTTT) platform for Google Smart Home™ devices, etc.).

Smart Devices and Amenity Controllers

In one embodiment, the integrated lock management and smart device control system 10 further comprises one or more access-controlled smart devices 42 and one or more amenity controllers 80 that control access to a smart device 42 or amenity in the room, facility, or on the premises of the room or facility.

Examples of smart appliances/devices 42 include the room's minibar, an HVAC thermostat, a television, a receiver, speakers, a light, a switch, a fireplace, a yoga studio, a rooftop bar or dancefloor, a pool, hot tub, a sauna, outlets, a garage door opener, windows, fans, blinds, humidifiers, air purifiers, sensors, security devices, doorbells, bridges, water valves for sprinklers, etc. Example of LMS-controlled community amenities include a pool and spa, lounge, dining hall, dance hall, exercise room, fitness center, gym, tennis court, racquetball court, studio, conference room, theater, and the like. Typically, access to these amenities are controlled through locksets—some similar or identical to locksets 61-65 or 500, and some configured for outdoor gates and other entrances—so the controller for the amenity may be identical or nearly identical to the already described lock controller 80. For convenience, amenity controllers may also be referred to by reference number 80.

In one embodiment, a "smart device" refers to one device 42 of a collection 45 of electronic devices, such as home automation/Internet of Things (IoT) devices, that are equipped for control, scheduling, and/or programming according to a communications standard. It is important to note that as used in the specification, the phrase "home automation" is not limited to devices deployed in homes but also extends to hotels, guest rooms, vacation (e.g., Airbnb) properties, multiunit housing, camps, and other dwellings and accommodations. The phrase "home automation" is used because of its widespread use in marketing devices of this nature and its familiarity to the public.

Centrally controlled community amenities, by contrast, are envisioned to usually be access-controlled via an LMS controller that is substantially similar to a lockset controller 80. As envisioned, the amenity controller is constructed with substantially the same elements as the lock controller 80. Moreover, it may be configured to receive a plurality of credential verification codes 76 from the internet gateway 20 (e.g., one for each checked-in guest), authenticate a credential 70 transmitted to it by a guest's mobile phone 58, and provide access to the amenity. More specifically, the amenity controller 80 is configured to receive and authenticate the LMS guest credential 70 or some derivative 71, 72 thereof, authenticate it, and provide access to the amenity, assuming that the amenity has been paid for or provided to the guest as a standard feature of the accommodation.

However, there is no strict distinction between a "smart device" and an "amenity." There may be considerable overlap, particularly in situations where the amenity is a service, is provided by a smart device, and/or is not LMS controlled. For example, a smart device 42 may be a light or a smart TV whereas an amenity may be an access-restricted or access-controlled television or paid programming. A computer may constitute both an amenity and a smart device. A minibar may be equipped with either a smart lock or an LMS-controlled amenity controller.

Figure 10:
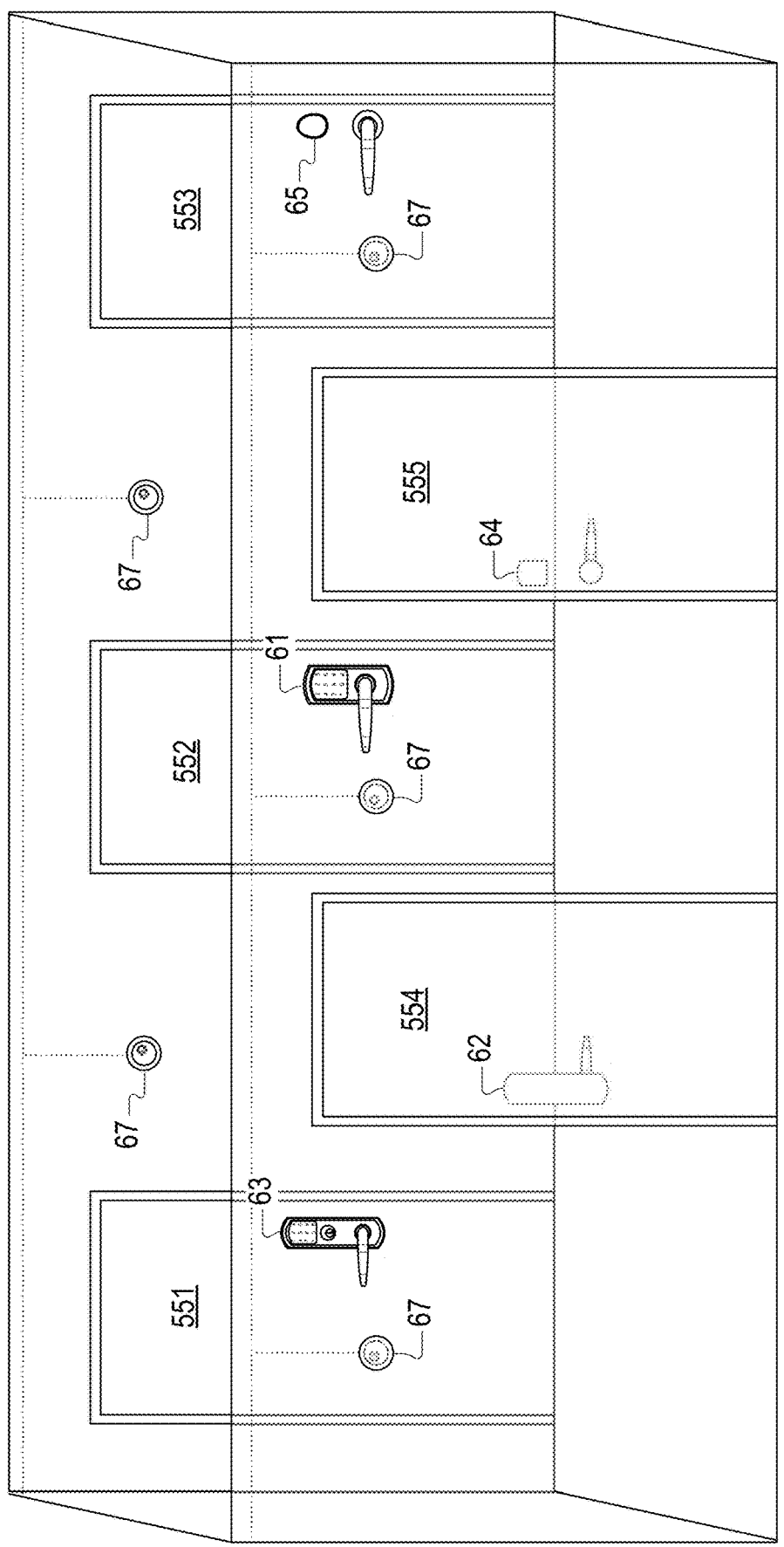
FIG. 10 illustrates a plurality of locks installed for rooms adjoining a hotel hallway.

Another example that blurs the distinction between a smart device and an amenity is a security camera. There are many security cameras that can be operated as a smart device; and many others that can operated as part of an LMS or a security system accompanying or integrated with an LMS. FIG. 10 illustrates a hotel hallway 550 with doors 551-555 to five rooms that are equipped with network-connected and lock-controller-equipped locks 61-65. Wide-angle network-connected security cameras 67 are also provided, each camera 67 facing or generally centered on a door 551-555 opposite the camera 67. In one embodiment, a manager is given access through the administrative app 94 to configure each camera 67 to assure that it is associated with the door 551-555 most directly across the hallway from the camera 67. In one embodiment, the administrative app 94 configures smart device cameras using an SDC credential 66. In another, the administrative app 94 configures cameras 67 using an LMS credential 70.

Figure 11:
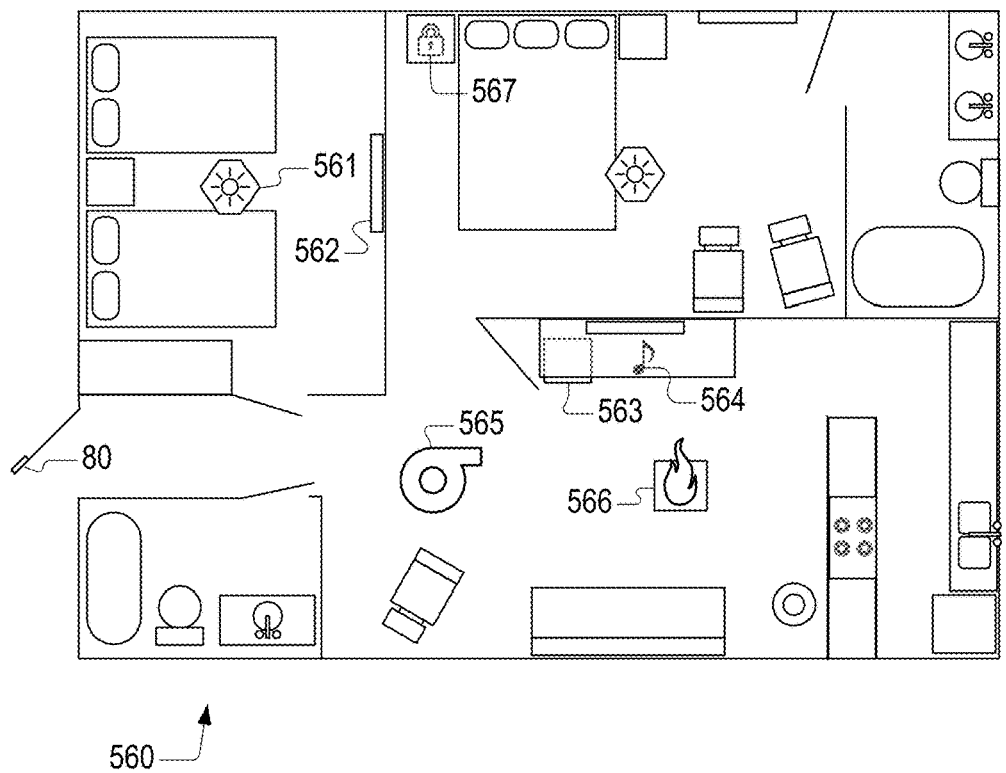
FIG. 11 illustrates a layout of a two-bedroom suite that has several home-automation-manageable features and amenities.

FIG. 11 illustrates a 2-bedroom suite layout 560 with several access-controlled/programmable smart devices and home automation/IoT features. A guest who has loaded the guest app 94 and LMS guest credential 70 onto their phone gains access to both the lock controller 80 and the smart devices 42 installed in the suite. In one example, programmable smart devices include a light 561 and a TV 562 for the second (e.g., kids') bedroom, enabling the parents to enforce a lights-out and TV-off bedtime policy that they configure. Example of smart device configurations include HVAC thermostat settings 565, music settings 564, and fireplace settings 566, which allow a guest to program features that affect the ambience of the suite. Two more examples of access-controlled amenities are the suite's mini-bar 563 and safe 567.

Figure 38:
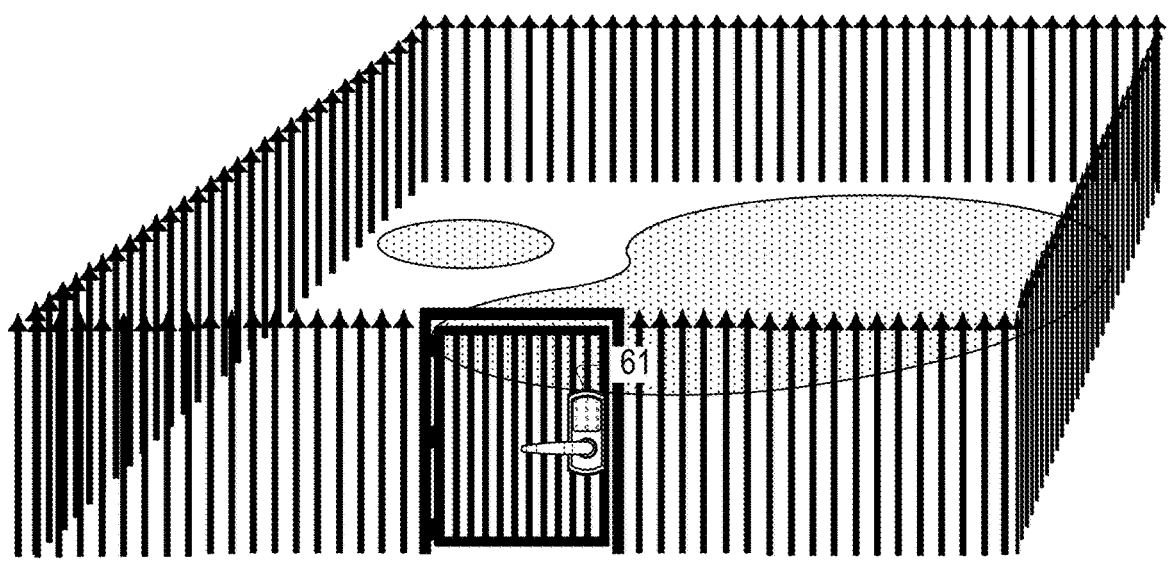
FIG. 38 illustrates an access-controlled pool and hot tub.
Figure 39:
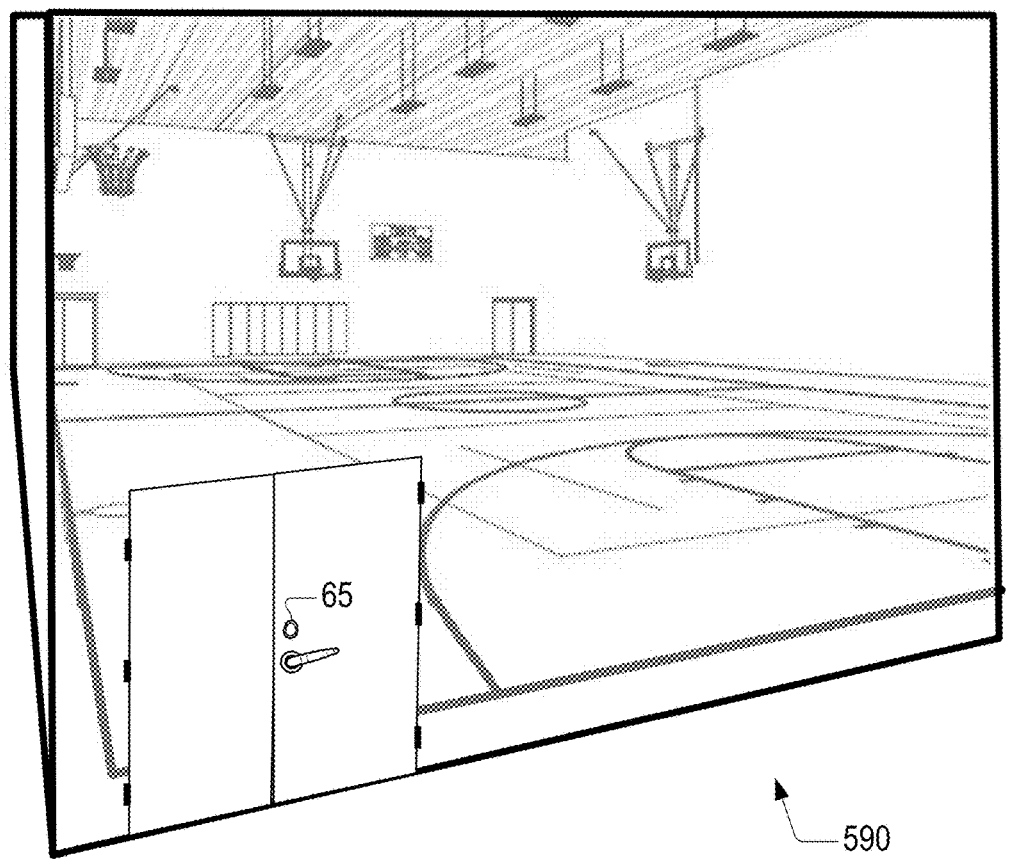
FIG. 39 illustrates an access-controlled basketball gum.
Figure 40:
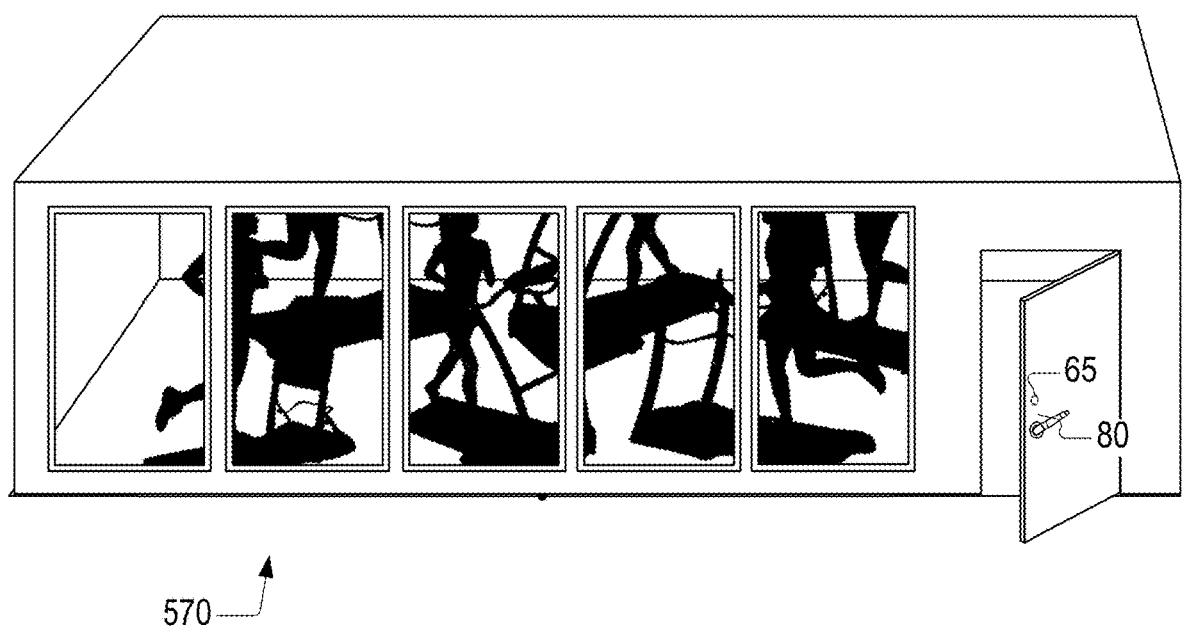
FIG. 40 illustrates an access-controlled exercise facility.

FIGS. 38-40 illustrate practical applications of the integrated lock management and smart device control system 10. FIGS. 38 and 39 illustrate two more community amenities, an outdoor pool 580 and a basketball gym 590, respectfully, that are also equipped with lock controllers 80. Hotel conference rooms, bars, lounges, racquetball courts, indoor swimming pools, yoga studios, dining halls, camp mess halls, dance halls, theaters, and any other physical enclosure may be similarly equipped. Guests get access to amenities featured as part of their accommodation or otherwise purchased using their physical tokens 50 and/or mobile phones 58. FIG. 40 illustrates a community amenity in the form of an exercise room or studio 570. Access to the exercise room 570 is controlled by the amenity controller, which here is a lock controller 80, that equips the lockset 65 in a door to the exercise room 570.

Administrative, Guest, and Friend Apps

Figure 15:
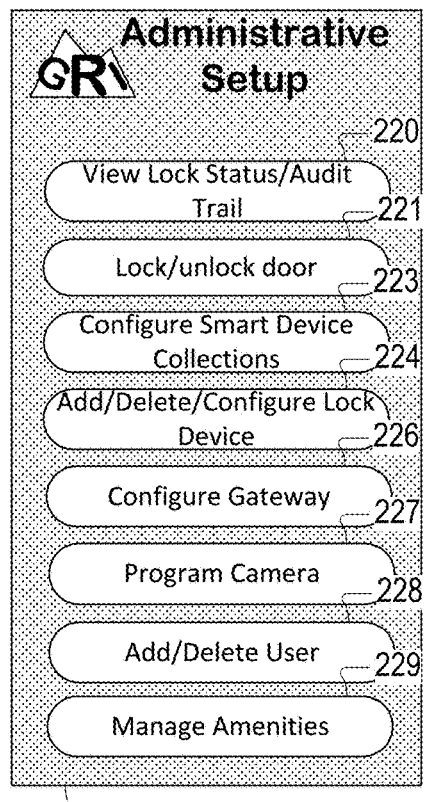
FIG. 15 illustrates a secondary authentication screen of the administrative app.
Figure 16:
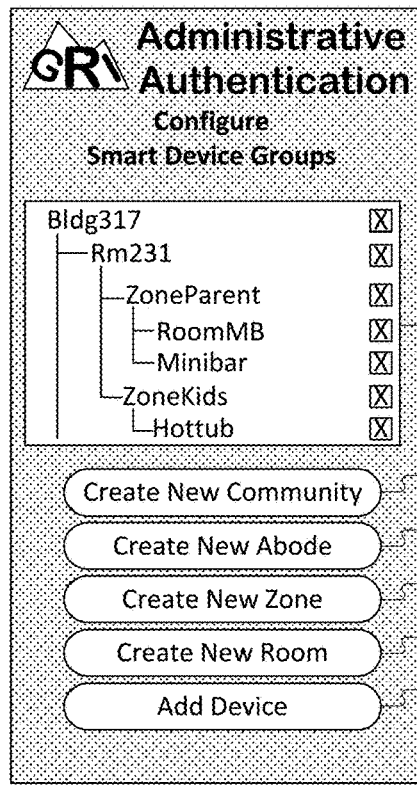
FIG. 16 illustrates an administrative setup screen of the administrative app.

FIGS. 14-22 illustrate one embodiment of the administrative app 94. The administrative app 94 presents a login screen 202 (FIG. 14) and a two-factor authentication screen 212 (FIG. 15). After a manager successfully logs in, the administrative app 94 presents a setup screen 222 (FIG. 16) that presents the manager with a number of options, including for example, view lock status/audit trail 220, lock/unlock door 221, configure smart device collections 223, add/delete/edit lock device 224, add/delete smart home devices 225, manage/configure gateway 226, program camera 227, and add/delete user 228.

Selecting the view lock status button 220 opens a new screen (not shown) revealing whether the door is locked, whether it has been assigned a credential, and the name of the guest to whom the room or facility has been assigned. The new screen also provides a button for accessing an audit trail (as shown, for example, in FIG. 34). This feature enables the manager to load an audit trail of every access attempt, whether or not successful, in the lock controller's memory along with a timestamp and an identifier associated with the credential. The audit trail is a security-relevant chronological record or set of records that provide documentary evidence of the sequence of activities that have affected at any time a specific operation, procedure, or event.

The configure SDCs button 223 opens a configure SDC screen 212 (FIG. 16), which presents a scrollable hierarchical list 211 of the smart devices 42 and the rooms, zones, abodes, communities, and/or other groups to which they belong. Buttons 212, 214, 216, and 217 enable the manager to create and name new communities, abodes, zones, and rooms (or other appropriate hierarchical groupings), respectively. In one implementation, the order in which these entities are arranged in the hierarchy can be re-arranged by selecting, holding, and dragging the entity to an appropriate place within the hierarchy. Button 219 enables the manager to find, select, and assign particular smart devices 42 to particular groups within the hierarchy. In one implementation, this includes the ability for the manager to add the lockset 500 to an SDC 45 and determine its position in the SDC 45's hierarchy. In another implementation, this is further combined with functionality for registering or modifying the registration of a lockset 500 with the LMS 11.

Selecting the add/delete/configure lock device button 224 opens a new screen (such as FIG. 17 or FIG. 19) for identifying the lock device (FIG. 17) and/or for configuring its capabilities (FIG. 19). In one implementation, it also provides the manager with an option to disable the lockset 500 from being accessed through the LMS 11.

The configure gateway button 226 enables the manager to specify internet connection settings with a selected internet gateway. In one embodiment, it also enables a manager to configure the lock controller 80 to act as a smart device hub 41 through which all smart device 42 access communications are filtered. The program camera button 227 enables the manager to program recording settings for a camera 48 surveilling access attempts on the room and optionally also nearby rooms.

The lock/unlock door button 221 locks and unlocks the door controlled by the lockset 500. The optional add/delete user button 228 is particularly useful for pared-down, non-centralized LMSs. This enables a manager to use the manager's programming device 54 to program each lockset 61-65, 500 with one or more authorized users. This information can be entered by management, cleanup staff, or anyone equipped with an appropriate device 54 between every check-out and check-in. Optionally, a manage amenities button 229 enables the manager to access and update settings for nearby amenities, such as pools, spas, gyms, exercise rooms, pool rooms, theaters, and the like.

The invention is clearly not limited to a device 54 and administrative app 94 that provides all of, or only, the aforementioned functions. Other embodiments, not shown, provide other sets of buttons for a different set of functions. For example, a limit access to admin button could be provided to prevent a lock controller 80 from being assigned to a guest and ensures that access is restricted to admin or management. In one embodiment, the administrative setup screen, or another menu or submenu, provides the following functions: "Set names," "Passage mode," "Lockout mode," "Tamper attempt limit," "Tamper alarm duration," "Wrong entry limit," "Wrong entry suspend duration," and "Dual Verification." In "Dual Verification" mode, two valid credentials would be needed to unlock the door. In another embodiment, a menu or submenu provides the following functions relating to users: "Add," "Delete," "Suspend," "Restore," and "Set access right (all time/one time/by duration)."

In other embodiments, different sets of permissions and corresponding app 94 interfaces are provided to different personnel such as repair personnel, clean-up personnel, managers, and outside contractors.

In another embodiment, additional cards—referred to herein as "block cards"—enable a manger to disable a lockset and/or the guest card that operates it. This is particularly useful when a tenant has finished their lease or for evicting a tenant after obtaining an appropriate court order.

Figure 17:
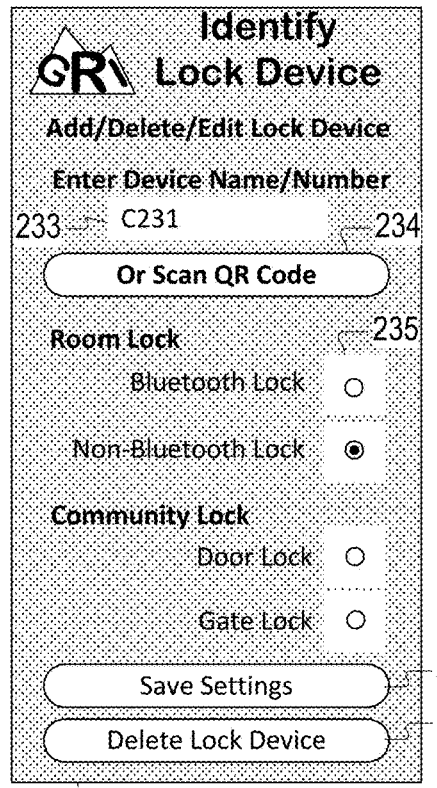
FIG. 17 illustrates a lock programming screen of the administrative app.

FIG. 17 illustrates an identify lock device screen 232 on the administrative app 94, that—in one implementation—is displayed when a manager selects the configure lock device button 224 in FIG. 15. A direct-entry field 233 is provided for entering an identification code for the lockset 61-65, 500. An option 234 to scan a graphic bar or pattern code method is provided for identifying the lockset 61-65, 500. Option buttons 235 are provided for designating whether the lockset 61-65, 500 is a room lock, a Bluetooth room lock, a community door lock, or a community gate lock. In one implementation, the save settings button 236 registers the lockset 61-65, 500 with the LMS 11. In another implementation, the delete lock device button 237 deregisters the lockset 61-65, 500 from the LMS 11, making it inaccessible through the LMS 11.

FIG. 19 illustrates another embodiment of a lock device setup screen 252 for a room or lodging. The screen 252 includes options 253-256 for enabling phone access, enabling friend/unchecked-in-guest invites, enabling WiFi communications, and enabling Bluetooth, Z Wave, RFID, and/or other means of communication.

FIG. 18 illustrates an optional community device access setup screen 242—accessed by selecting the manage amenities button 229—for a community amenity such as a pool, studio, fitness room, or VIP lounge. The screen 242 includes fields 243 and 244 for indicating open and close times as well as setup options 245-247 for requiring a credential and which types of credential carriers to support.

FIG. 20 illustrates a setup screen 262 for a camera surveilling access attempts on the room and optionally also nearby rooms. A direct-entry field 263 is provided for entering an identification code for the camera. An option 264 to scan a graphic bar or pattern code method is provided for identifying the camera. Option buttons 265-267 are provided for designating whether to record entries and entry attempts, to record exits, or to let guests see the videos.

FIG. 21 illustrates a gateway management screen 272 on the administrative app 94. Fields 273-275 are provided for entering the IP address of the gateway as well as for logging into the gateway. A dropdown list 276 enables the manager to select a particular camera to control. Buttons 277-280 also enable the manager to designate whether to link the camera to the LMP, record access entries and attempts, record exits, and let guests view the camera videos.

Figure 22:
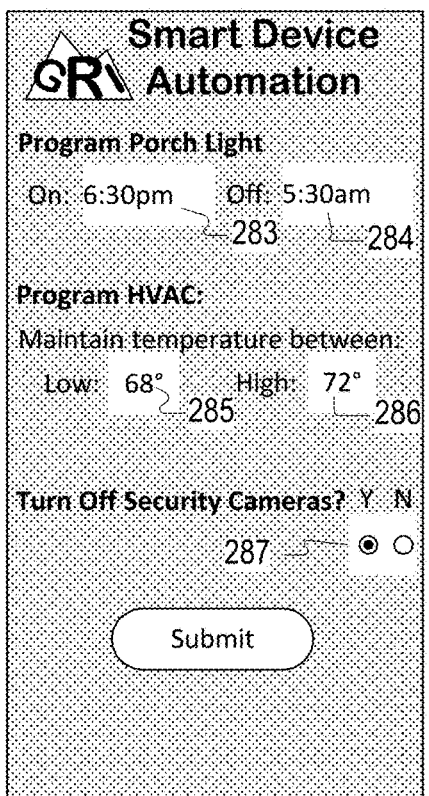
FIG. 22 illustrates a smart device/home automation/IoT setup screen of the administrative app.

FIG. 22 illustrates a smart device setup screen 28. In this particular example, the screen 282 provides fields and button options for turning a porch light on or off, maintaining the room temperature within a default range (e.g., 68° to)72°, and running the security camera. Different setup screens may be presented for different devices and made accessible by selecting and holding the device name where it appears in the hierarchical list 211.

Figure 23:
FIG. 23 illustrates one embodiment of a guest access token.

FIG. 23 illustrates a credential-carrying guest card 50. The guest card 50 bears a magnetic stripe or RFID tag. In the illustrated embodiment, the guest card has a bar or matrix code 51 (e.g., a "QR code") embellished or fixed onto the card 50 to facilitate downloading of the app 95 to a guest's phone 58. It also includes an instruction 53 to download the guest app 95.

FIGS. 24-35 illustrate the guest app 95. The guest app 95 comprises a program of instructions residing on a non-transitory computer-medium such as mobile phone flash or random-access memory (RAM). When the program is executed on the mobile phone, it enables a guest using the mobile phone 58 and possessing the physical token 50 to transmit the LMS guest credential 70 or an appropriate derivative thereof from the lock controller 80 to the mobile phone 58.

Figure 26:
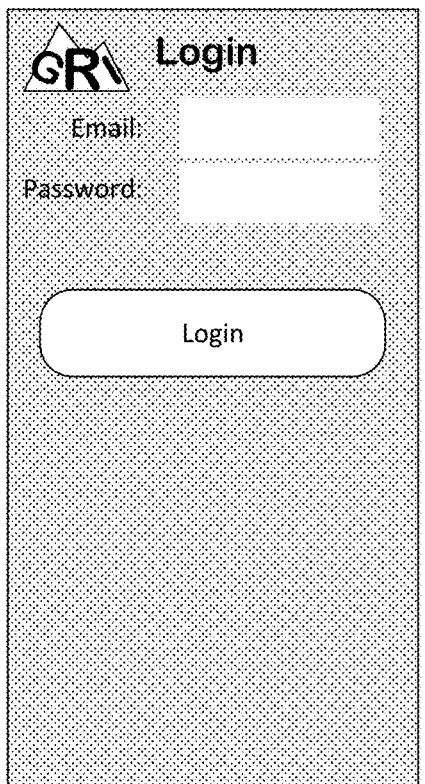
FIG. 26 illustrates a login screen of the guest app.

The guest app 95 presents the guest with a "Create Account" screen 292 (FIG. 24) with fields 293, 295 and 296 for the guest to enter their name, email, and password. In one implementation, a field 294 is provided for the guest to enter their room number. In another, the guest app 95 queries the LMS 11 or PMS for the information and fills it in. Another screen 302 (FIG. 25) presents a field for completing a second form of authentication. Thereafter, the guest can log into the app through a login screen 312 (FIG. 26).

Figure 27:
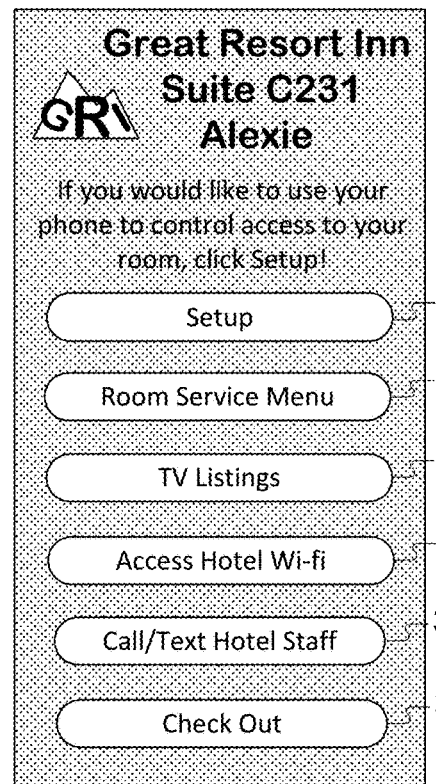
FIG. 27 illustrates an opening post-login panel screen of the guest app.
Figure 28:
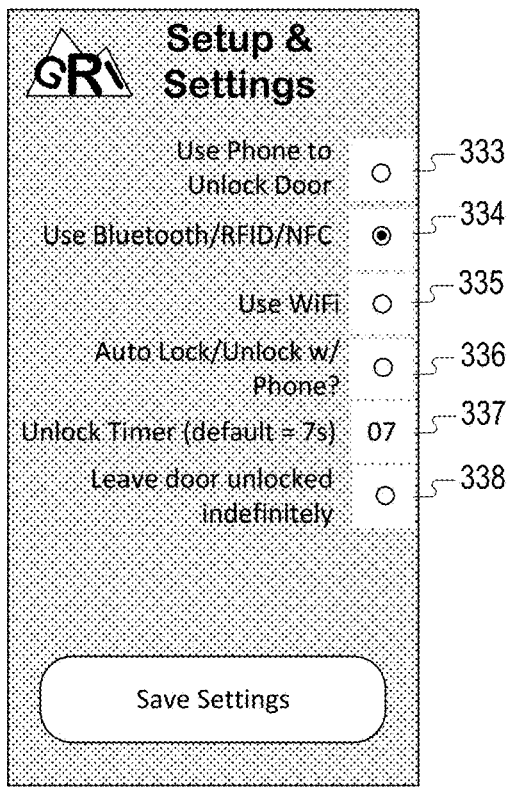
FIG. 28 illustrates a setup screen of the guest app.
Figure 29:
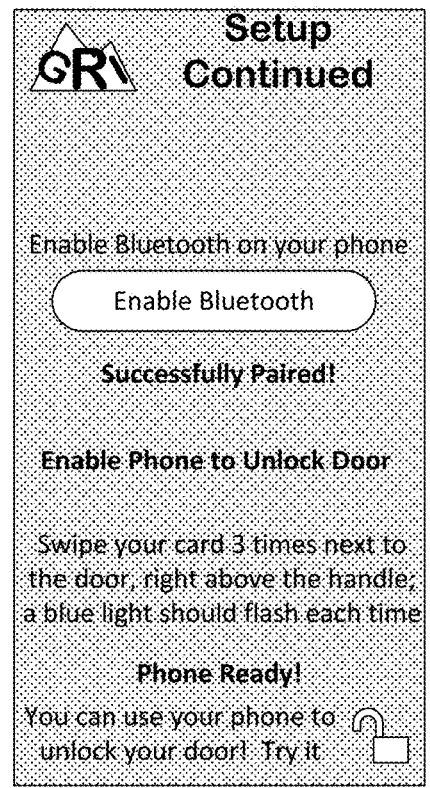
FIG. 29 illustrates a secondary setup screen of the guest app.

After the guest logs in, the guest app 95 presents a menu screen 322 (FIG. 27). In one implementation, the menu screen 322 enables the guest to navigate to setup 323, view a room service menu 324, view TV listings 325, access hotel wi-fi 326, call or text hotel staff 327, and check out 328. Selecting "Setup" results in a setup screen 332 (FIG. 28) that, in one implementation, allows the user to setup 333 their mobile phone to unlock the door, choose 334-335 between using Bluetooth, RFID, NFC, and WiFi to communicate with the lock controller, auto unlock 336 when the phone is in the vicinity of the lock controller, set 337 a length of time that the lockset remains in an unlocked position after unlocking the door, and set 338 whether the door should be left unlocked indefinitely when using the phone to unlock the door. FIG. 29 illustrates a follow-on setup screen 342 for pairing the guest's phone 58 with the lock controller 80 using Bluetooth or other communications means.

In FIG. 29, the credential 70 or its derivative 71, 72 is transferred from the lock controller 80 to the guest's mobile phone 58 through a special "handshake"—in this case, swiping the physical token 50 three times next to the door after pairing the phone 58. A guest who has received the physical token 50 downloads an app 95 and requests a credential 70, 71 to operate the lock controller 80. After registering with and logging into the app 95, the app 95 instructs the guest to transfer the credential 70 to the mobile phone 58 by swiping or waving the card 50 or other token in or next to the lockset 80 either a certain number of times, while or after pressing an app button, or by some other means requiring the presence of the guest at the facility or room. Performing the steps as instructed causes the credential 70, or a derivative 71, 72 thereof, to be transmitted from the lock controller 80 to the mobile phone 58.

Implementations that generate a derivative credential 71, 72 provide an additional layer of security. In one implementation, a derivative credential 71, 72 is generated that is a cryptographically signed version of the original credential 70. In another implementation, a derivative credential 71, 72 is generated that is a combination or transformation of the original credential 70 by or with a mobile phone credential.

Figure 5:
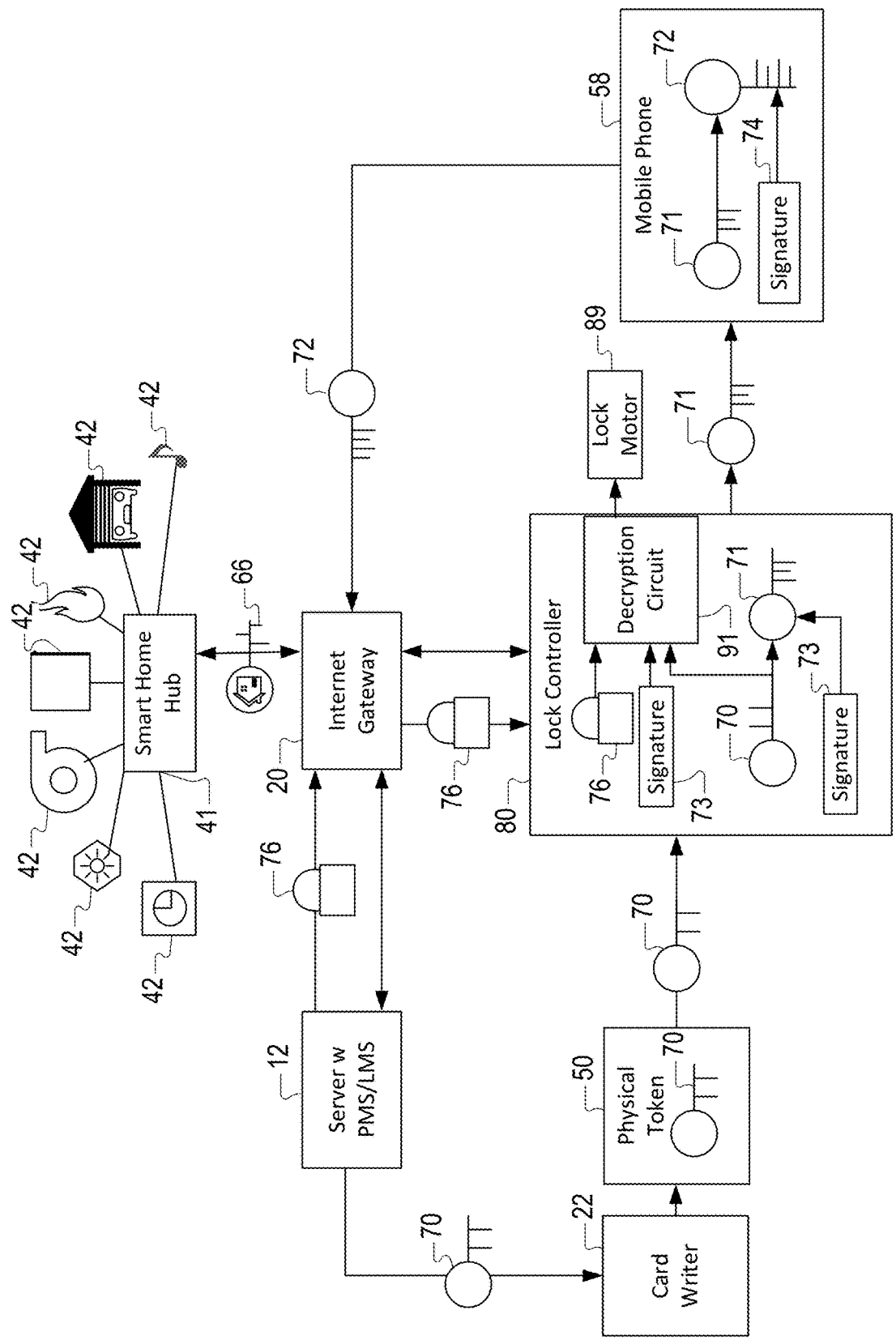
FIG. 5 illustrates an implementation of one embodiment of a credential passing setup for a lock management system.

FIG. 5 illustrates such an implementation. The server 12 sends an original credential 70 to a token encoder or card writer 22, which encodes a token 50 with the original credential 70. Meanwhile, the server 12 sends a corresponding credential verification code 76 to the lock controller 80 via an internet gateway 20. A guest carries the token 50 to a lock controller 80, which reads the original credential 70, decrypts and/or compares it with the credential verification code 76 and/or an internal signature 73 or code, and if the authentication is successful (e.g., there is a match), operates the lock motor 89 to unlock the lockset. The lock controller 80 also optionally generates a cryptographically signed version of the credential 70—that is, a derivative credential 71—and transmits it to the guest app 95 running on the guest's phone 58.

After the mobile phone app 95 has received the derivative credential 71, a phone-generated derivative 72 thereof (referred to herein as a "multi-derivative credential") is stored. For example, a multi-derivative credential 72 may be generated from a credential 70 that has been cryptographically signed or otherwise combined with or transformed by a lock controller signature 73 and a mobile phone signature 74.

When the guest wants to use the app 95 to unlock the lockset, the guest presses an appropriate app button. In response, the app transmits the credential 70, derivative credential 71, or multi-derivative credential 72 (it should be noted that for purposes of claim simplicity, "credential" may refer to any of them) to the lock controller 80—either through WiFi via an Internet gateway 20, or via another wireless communications means such as RFID or Bluetooth. The lock controller 80 then attempts to authenticate the credential. If the attempt is successful—meaning that there is a match—the lock controller 80 driver operates the motor 89 to unlock the lockset 61-65, 500.

When the guest wants to use the app 95 to access one of the smart home devices 42, in one implementation the lock controller 80 transmits an SDC credential 66 (e.g., username and password) to a smart home hub 41 in order to control, schedule, and/or configure the smart devices 42 connected to that hub 41. While in FIG. 5 the hub 41 is illustrated outside the lock controller 80, in one embodiment the hub 41 is incorporated into the lock controller 80.

In one embodiment, SDC credentials 66 and optionally smart device configurations are stored in the flash memory 88 of the lock controller 80. When a guest selects a button (such as button/tile 353 of FIG. 30) for accessing the smart devices 42, the guest app 95 sends the LMS credential 70 or a derivative 71, 72 thereof. If the controller 80 successfully authenticates the credential 70 or derivative 71, 72 thereof, the controller 80 uses the SDC credentials 66 to access and configure the smart devices 42. Advantageously, in order to terminate the guest's access to the smart devices 42, the system 10 need only to enforce an expiration date and time for the guest's stay or send a command, via network or via a block card, to purge the LMS credential 70 and/or derivatives 71, 72 thereof.

After the guest has setup their phone 58 as a door-unlocking device, the guest app 95 presents a panel/tile screen 352 (FIG. 30). In the implementation shown, the panel screen 352 includes a selectable/depressible "access hotel wi-fi" button/tile 346, room service menu button/tile 347, TV guide button/tile 348, "change setup settings" button/tile 349, "invite friends!" button/tile 350, "indoor bar" button/tile 351, "automation features" button/tile 353, call/text hotel staff button/tile 354, "checkout" button/tile 355, "entry/exit access log" button/tile 356, "TV remote" button/tile 357, "unlock community lock" button/tile 358, and "unlock/lock my door" button/tile 359.

When a guest selects the "Invite Friends" button 350, the guest app 95 presents a "Setup Friend Access" screen 362 (FIG. 31) with fields 353-355 for entering a new share or revoking a previous share and for entering the friend's or invitee's name and phone number. Fields may also be provided for indicating the starting time 366 and ending time 367 for which the invitation applies.

After entering these details, the guest app 95 presents a "Setup Shared Access" screen 372 (FIG. 32). Here, the guest can decide whether to give or deny the friend, a third-party invitee, or the minor children of a guest (for example) access to a number of amenities, for example, the suite minibar 370, a VIP bar and lounge 371, an exercise room or studio 373, a tennis court 374, a pool 375, a sauna 376, a rec room 377, or a continental breakfast 378. In one implementation, the guest may be charged for providing access to one or more of the amenities. In another implementation, the invitee is given an option to select and pay for amenities.

In another embodiment, not shown, the guest can use the guest app 95 to program a blank card 55 to give to a family member, friend or third party. This may be in place of or in addition to the friend app function, and the blank card 55 may store the same access controls/restrictions that could otherwise be given via a friend app 96. Advantageously, the friend or third party need not download the friend app 96 in order to access the facility.

When a guest selects the "Automation Features" button 353 in the panel screen 352, the guest app 95 presents controls for one or more "home automation" features (which are not restricted to homes), such as a light, fan, fireplace, garage door, HVAC, or home theater system. FIG. 33 illustrates one example home-automation control screen 382. There, the user can indicate a range of temperatures 383, 384 between and including which to maintain the temperature, a range of times 385, 386 during which to keep a porch light on, a range of times 387, 388 to turn lights and/or a TV off in a second (e.g., kids') room, and selections 379, 380, 381 and 389 for playing a selected genre of music in the suite.

In a different embodiment, home automation/IoT features are not controlled from within the guest app 95. Instead, those features are controlled from a separate home automation app. For example, in one embodiment, a guest downloads both the guest app 95 and an app provided by the third-party maker of the home automation/IoT controllers, such as Apple's HomeKit®, Samsung's SmartThing®, Google Home®, Creston Home®, Control4®, Savant®, and RTI®. In another embodiment, selecting the "Automation Features" button 353 causes the guest app 95 to open or switch to the appropriate automation app, assuming it is installed, and direct the guest to a download or store app/page to download the app, if it is not already installed. In either case, configuration and/or permissions information is communicated from the guest app 95 to the third-party home-automation app to enable the guest to control the home automation features. Advantageously, this effectively transforms the door lock/lockset 61-65 into a key-keeper for guests who wish to access home automation features. Also advantageously, programming performed by the guest to operate the smart appliances and other home automation devices (herein referred to as "secondary programming") is controlled only by the guest, not by management through the LMS 11 (the configuration of which is referred to as "primary programming").

When a guest selects the "Entry/Exit Access Log" button 356 in the panel screen 352, the guest app 95 presents a screen 392 (FIG. 34) that reveals a scrollable log 393 of events associated with entering and exiting the suite and generating and transferring credentials.

When a guest selects the "Check Out" button 355 in the panel screen 352, the guest app 95 presents a screen 402 allowing the user to leave a review 403, review room charges 404, have a receipt of room charges emailed 405, request a later checkout 406, extend their stay 407, terminate their stay early 408, and/or check out now 409.

FIG. 36 illustrates a partially boilerplate, partially personalized text 413 generated by the guest app 95 and guest to invite a friend to a suite for a slumber party. The guest app 95 generates the portion of the illustrated text from "Click the link below" on and presents it in the guest's texting app (with the friend's phone number automatically filled in) for the guest to embellish, personalize, and send. The text includes a link for downloading the friend app 96.

FIG. 37 illustrates a "Create Account" page for the friend app 96. It includes fields 423-427 for the friend's name, email address, password, credit card number, and credit card expiration date. The friend app 96 also provides screens similar in part to screens 322 (FIG. 27) 332 (FIG. 28), 342 (FIG. 29), 352 (FIG. 30), and 372 (FIG. 32), but with fewer controls. For example, the friend app 96 may exclude controls and screens for inviting yet further friends, for setting up home automation devices, for checking out, or for reviewing the access log. A screen similar to screen 372 (FIG. 32) would provide the friend with an opportunity to pay for access to fee-for-use amenities not paid for by the guest.

Methods of Operation

Figure 6A:
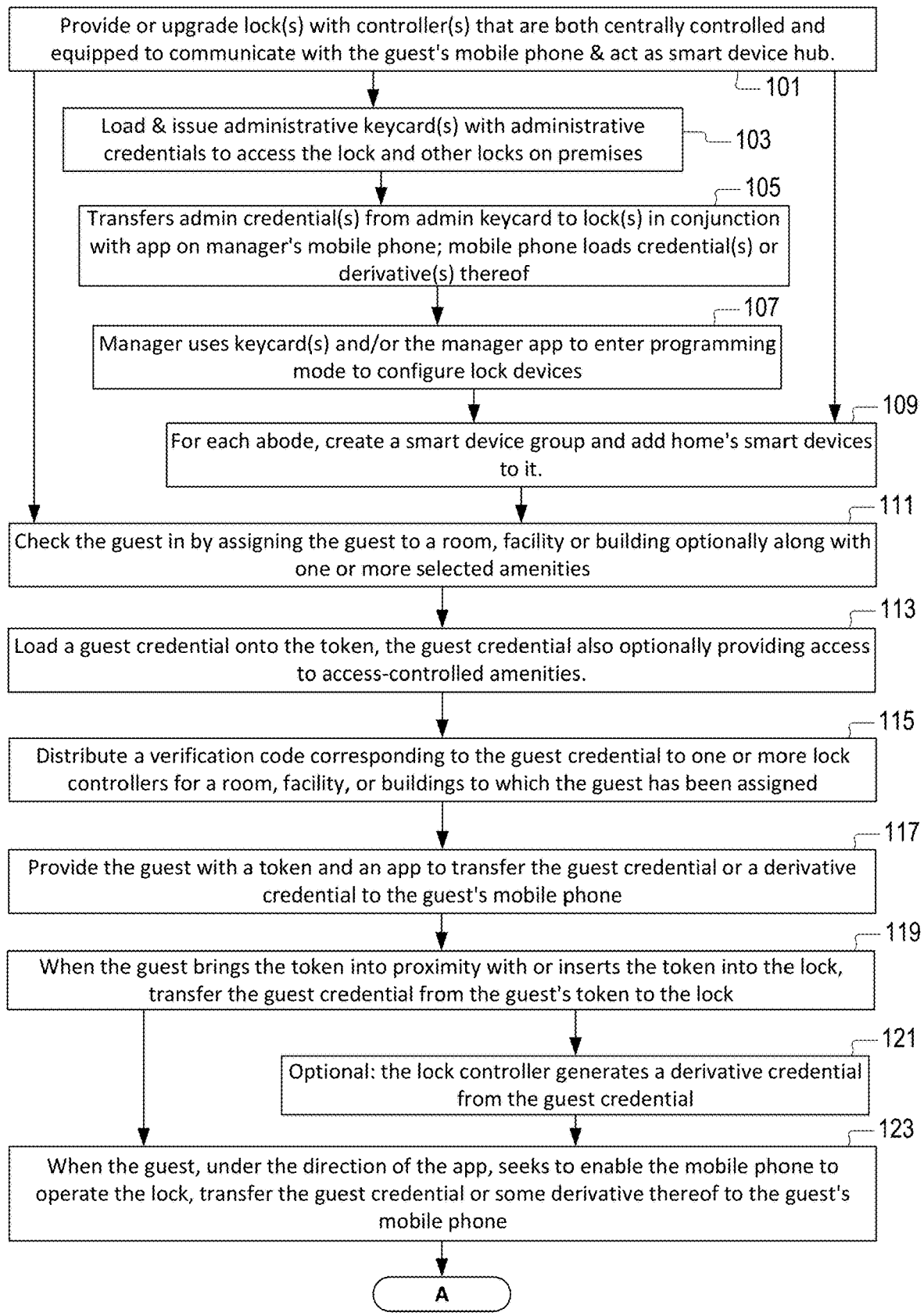
FIG. 6 is a flow chart spanning two drawing pages labeled FIG. 6A and FIG. 6B, respectively, that illustrates one embodiment of a method for managing lock controllers, physical tokens, both guest and administrative credentials, friend access through mobile phone apps, and access to amenities.
Figure 6B:
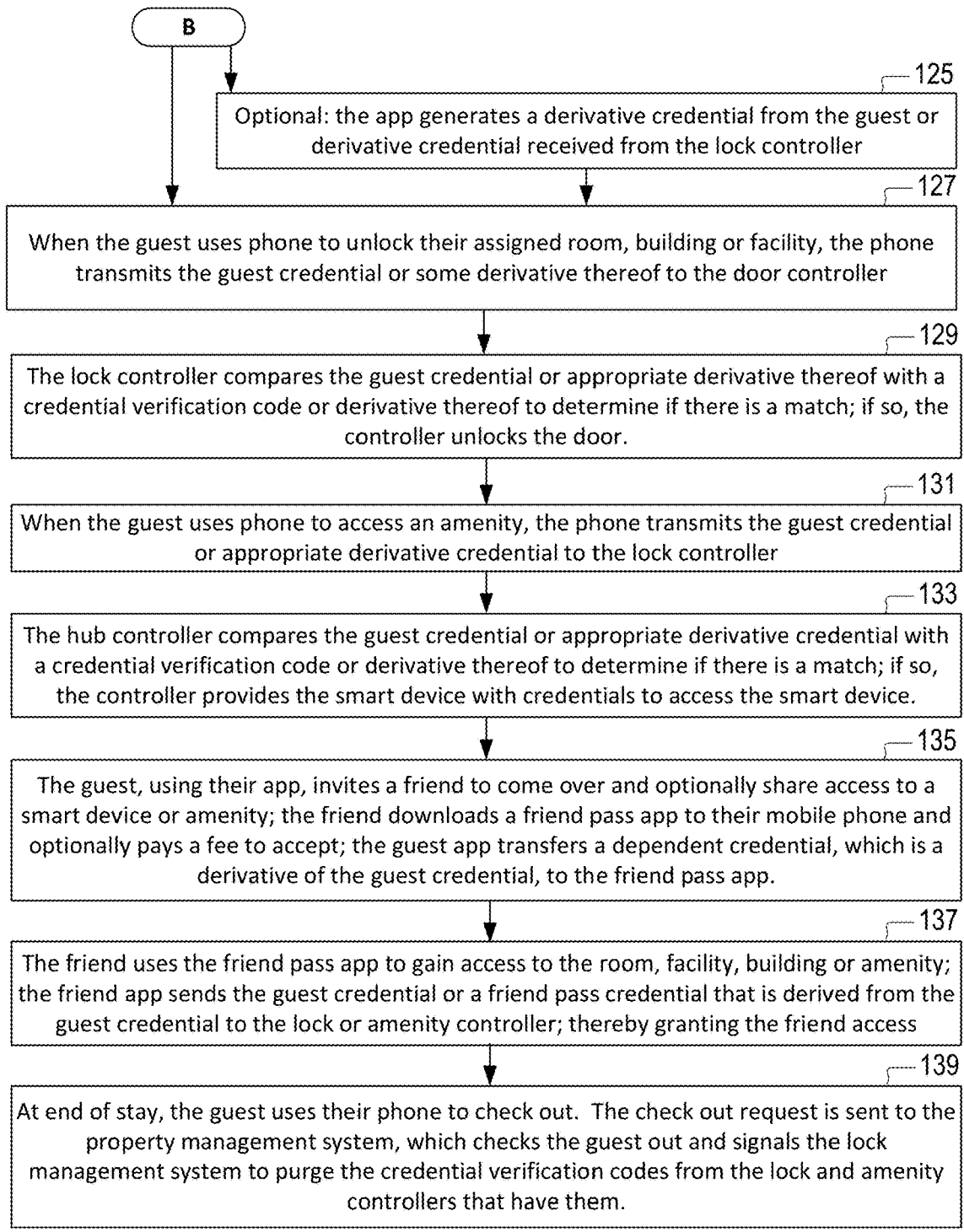

FIG. 6 illustrates one embodiment of a method of providing a guest with a mobile phone with restricted access to a room, facility or building, such as a hotel, vacation rental, or other lodging place, storage place or entertainment facility. In one step, access to the room, facility or building is restricted with a lockset 500 that is equipped to communicate wirelessly with the guest's mobile phone 58 and either wirelessly or through RFID or Bluetooth or another wireless communication means with a non-battery-powered physical token 50. Or as stated in block 101, one or more locksets are provided or upgraded with controllers 80 equipped to communicate with both a non-battery powered physical token 50 or the guest's mobile phone 58. Likewise, in block 109, one or more amenities may be equipped or upgraded with access restriction management controllers having means to communicate with the guest's mobile phone 58.

In block 103, one or more administrative keycards or key fobs 52 are loaded with one or more administrative credentials 68 to access the lockset and other locksets on the premises. The administrative keycards or key fobs 52 may also be loaded with one or more credential verification codes 74 to transfer to the lock controllers 80. The administrative keycard or key fob 52 is then issued to the appropriate management personnel.

In block 105, a person such as a property manager entrusted with the administrative keycard or key fob 52 transfers the credentials 68 from the administrative keycard or key fob 52 to the locksets 500. This is accomplished, in one embodiment, by swiping or waving the administrative keycard or key fob 52 in or next to the lockset 500 or lock escutcheon in conjunction with the administrative app 94. This is accomplished, in another embodiment, by entering a pin number into the lockset's keypad 501 while holding the keycard or key fob 52 in proximity (close enough to communicate) to the lock controller 80. In one implementation, the manager is also able to load the credentials onto the manager's mobile phone or device 54 through the use of an administrative app 96 that functions equivalently to a guest app 94 described further below.

In block 107, the manager uses the keycard/key fob 94 and/or the manager app 96 to configure the locksets 500 and their means of communication by, for example, swiping the administrative card/fob 52 three times within one minute to enter into a programming mode. Once in the programming mode, the manager is able to configure and enable the lockset 500 and add or delete users.

In block 109, the manager creates an SDC 45 that includes the room/abode lockset 80 and all of the smart devices 42 associated with that room/abode. The manager may also arrange the smart devices 42 in a hierarchy, for example, full abode->zone (e.g., upstairs v. downstairs, parents v. kids)->rooms in the abode.

In block 111, the guest is checked-in by assigning the guest to a room, abode, facility, or building. In block 113, the guest is provided with access to the room, abode, facility or building by loading an LMS guest credential 70 onto the token 50. The token 50 may be a magnetic stripe card or an object equipped with a passive RFID circuit to receive and communicate the LMS guest credential 70. Optionally, the LMS guest credential 70 or supplemental credentials also provide the guest with access to access-controlled amenities. In block 117, the guest is issued the token 50, which can alone be used to unlock the guest room's lockset 80 and in some implementations to access amenities. The guest is also given instructions to download a guest app 95 to transfer the LMS guest credential 70 or a derivative credential 71, 72 to the guest's mobile phone 58. For example, the token 50 may include a scan pattern 53 for the guest's mobile phone 58 which directs the phone 58 to a site for downloading the app 95.

Meanwhile, in one implementation in which the lockset and amenity controllers 80 are networked with the server 12 and indicated by block 115, the LMS 11 transfers one or more credential verification codes 74 to the lock and/or amenity controllers 80 to which the guest has been granted access. In alternative, decentralized implementations, either the credential verification codes 94 do not exist or they are transferred through administrative cards/fobs 52 or even through the guest cards/fobs 52 themselves. Accessing a lock controller 80 with a new, valid credential modifies the credential verification code 94 or other memory logic in the lock controller 80 to prevent the lock controller 80 from granting access to a previously used credential.

In block 119, the guest brings the token 50 into proximity with or inserts the token 50 into the lockset 500 as indicated by the app 95, resulting in a transfer of the LMS guest credential 70 from the guest's token 50 to the lockset 500. Optionally, in block 121, the lock controller 80 generates a derivative credential 71 from the LMS guest credential 70, for example, by cryptographically signing the LMS guest credential 70 with a lock credential specific to the lock controller 80.

In block 123, when the guest, under the direction of the guest app 95, seeks to enable the mobile phone 58 to operate the lock, the LMS guest credential 70 or the derivative credential is transferred to the guest's mobile phone 58. In block 125, the guest app 95 optionally generates a derivative credential 71 from the LMS guest credential 70 or a derivative 72 of the derivative credential 71 (i.e., a multi-derivative credential) received from the lock controller 80. When in block 127, the guest selects an appropriate app control, the app 95 transmits the last transformation of the credential—whether it be the original LMS guest credential 70, a derivative credential 71, or a multi-derivative credential 72—to the lock controller 80 to operate the lockset 500 and gain access to the abode, room or building. In block 129, the lock controller's decryption logic decrypts and analyzes the credential 70-72, optionally comparing it with a credential verification code 74 or derivative thereof, and if the credential 70-72 is authenticated (e.g., there is a match), then the controller 80 unlocks the door.

In one embodiment, access to one or more amenities is also restricted through amenity controllers 80 and access to smart devices 42 are programmed to limit access to the smart devices 42. Access control may come in many forms, including requiring passwords or other credentials to control power to or mechanically lock a device or facility. When generating the LMS guest credential 70, the credential 70 is configured or another credential 66 is added to provide access to the smart device 42 or amenity. Amenity controllers are part of the LMS 11 and are equipped to wirelessly communicate with the guest's mobile phone 58 and read the guest or other credential 70-72. The smart devices 42 are part of a managed SDC 45 and are equipped to communicate with the guest's mobile phone 58 either directly or via an LMS-controlled hub 41.

In block 131, the guest, after downloading the credential to their mobile phone 58, uses their mobile phone 58 to communicate the LMS guest credential 70 to the lock controller 80 or hub 41, which in turn authenticates it. The hub 41 may use any of the methods of authentication discussed earlier with respect to the lock controller 80, including the optional use of a credential verification code 74 corresponding to the LMS guest credential 70 or some derivative 71-72 thereof. In block 133, the hub 41 transmits a smart device or amenity credential 66 to the smart device 42 or amenity. The guest then has the ability to control and configure the smart device 42.

In block 135, the guest app enables the guest to invite a friend or third party to have access to the room, facility, building and/or an amenity. Examples of third parties include a delivery person or company (such as UPS) that is delivering groceries, a dog walker, and maintenance/service personnel. By issuing a temporary passcode, the guest can have groceries delivered straight to their fridge, their dog walked twice a day by a dog walker, and service performed to clean and tidy up the accommodation.

The guest, using the guest app, invites the friend or third party. In response to the invitation, the friend or third party downloads a friend pass app and optionally pays a fee to accept. The friend, through the friend/third-party pass app, requests that the guest app send it the LMS guest credential 70 or a friend/third-party pass credential that is derived from the LMS guest credential 70. The guest app, in response, sends the LMS guest credential 70 or friend/third-party pass credential to the friend pass app 96.

In block 137, the friend/third-party uses the friend/third-party pass app 96 to gain access to the room, facility, building or amenity and to smart devices in the room, facility or building. The friend/third-party app sends the LMS guest credential 70 or a friend/third-party pass credential that is derived from the LMS guest credential 70 to the lock or amenity controller 80, thereby gaining access.

In block 139, the guest uses the guest app to check out. The check-out request is sent to the PMP 31, which checks the guest out and signals the LMS 11 to purge the credential verification codes 74 from the lock and amenity controllers 80 that have them. Alternatively, the credentials 70-72 are disabled by some other manner (examples of which have been described in this specification).

Figure 7:
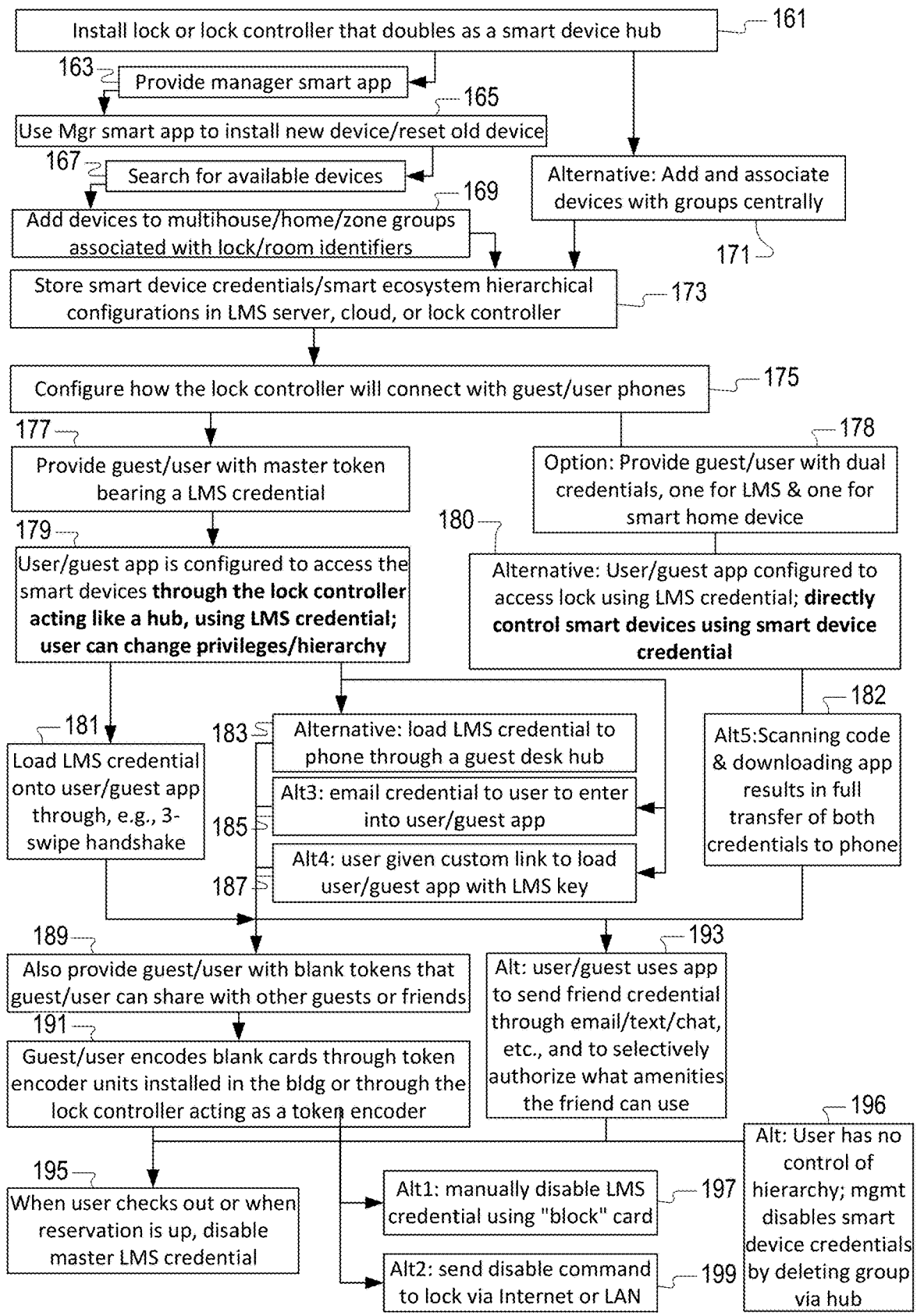
FIG. 7 is a flowchart illustrating several alternative embodiments of an integrated smart device and lock management system.

FIG. 7 presents another embodiment of a method of integrating and operating a lock management system with a smart device control system. In block 161, one or more locks or lock controllers 80 which double as smart device hubs 41 are installed. In block 163, a manager smart app 94 is provided to the manager. In block 165, the manager smart app 94 is used to install new smart devices 42 or reset old smart devices 42. In block 167, the manager smart app 94 is used to search for available devices 42 and, in block 169, add the ones associated with a particular suite or abode to an integrated SDC 45. Block 169 may also include manager configurations of multiunit, abode/suite/home, zone and/or room groups for the integrated SDC 45 and manager assignment of the smart devices 42 to their proper groups.

In an alternative embodiment to blocks 163-169, the integrated SDC 45 is generated, stored, and managed centrally (block 171). Whether proceeding from block 169 or block 171, in block 173, the integrated SDC 45—including its hierarchical configuration and credentials 66 for accessing the smart hub 41 and smart devices 42—are stored in the lock controller 80 or on the local or cloud-based LMS server 12.

In one embodiment, the smart devices 42 available to an abode or suite are initially, or upon reset, configured to be discoverable by a smart phone with a corresponding smart device app. This enables the manager to find and add the smart device 42 to an integrated SDC 45. Once added, however, the smart device 42 is no longer discoverable or configurable without using the credentials 66 (username and password) that were used to create the integrated SDC 45. Importantly, this prevents someone else, such as a guest in an adjoining suite, from adding the smart devices 42 to their own SDC 45.

Moreover, in one embodiment, the credentials 66 are stored by the lock controller 80 or on a network-connected device or server 12. A guest accesses the smart devices 42 associated with their suite or abode by transmitting the LMS guest credential 70 to the lock controller 80, which after authenticating the LMS guest credential 70 responsively transmits the stored SDC credentials 66 to the appropriate smart device 42. This creates an authenticated session in which the smart devices 42 and their controls and configurations are revealed to the guest through the guest app 95.

The smart devices 42 again become discoverable when they are deleted from the integrated SDC 45, or when the entire configuration profile for the SDC 45 is deleted. Alternatively, they can be manually reset to default factory settings and then again become discoverable.

In block 175, the lock controller 80 is configured to connect with guest/user phones through Bluetooth, Z-wave, WiFi, or some other way, as shown, for example, in FIGS. 17 and/or 19.

In block 177, a master token 50 bearing an LMS credential 70—which may be unique for each guest or group of guests sharing an accommodation—is issued to the guest at a lobby, office, by computer, or via courier, mail or package delivery.

In block 179, a guest app is configured to access smart devices 42 through the lock controller 80 acting like a hub 41. The guest app 95 and lock controller 80 use LMS credentials 70-72 to gain access to the smart devices 42 via SDC credentials 66 that are passed from the lock controller 80 to the smart devices 42. The guest app 95 provides one or more screens 382 (FIG. 33) for controlling and scheduling or otherwise configuring the smart devices 42. The guest app 95 also provides a screen 372 (FIG. 32) for setting privileges for invitees, including family members such as children staying at the abode with the guest. These new privileges are either stored on blank cards 55 provided to the guest or sent to invitees' phones or other digital devices. In one implementation, the guest app 95 also provides a screen like the one shown in FIG. 16 for the administrative app 94, enabling the guest to change the smart device collection hierarchy as well.

In block 181, the LMS credential 70 is transferred from the token 50 to the guest's phone 58 using the lock controller 80 for the assigned abode/property as an intermediary or gatekeeper. An electronic "handshake"—that is, a process performed according to a protocol for establishing, encrypting, and/or regulating the data transfer, e.g., the 3-swipe handshake discussed earlier in the specification—is used to transfer the LMS credential 70 to the phone 50. Blocks 183, 185 and 187 depict alternative credential-transferring embodiments. In block 183, the guest loads the LMS credential 70 (and optionally also the SDC credential 66) to their phone 58 not through the lock controller 80 but instead through a guest desk hub (not shown). In block 185, an encrypted version of the LMS credential 70 (and optionally including the SDC credential 66) is emailed, texted, or otherwise communicated directly to the guest and entered into or automatically received by the guest app 95.

In block 187, the user's token or a sleeve/jacket for the token is provided with a scan code 51 that provides not only a link to the guest app 95, but also appended data encrypting the LMS credential 70 (and optionally including the SDC credential 66). Alternatively, the guest's token is provided with two scan codes 51, one for downloading the guest app 95, enabling transfer the LMS credential 70 to the phone 58, and one for downloading the SD credential 66 to the phone 58. Alternatively, two tokens are issued to the guest, one providing a scan code for downloading the guest app 95, and the other providing a second scan code that encrypts the SDC credential 66. The guest app 95 is configured to decrypt the credential 70 and then use it (or a derivative and/or encrypted form thereof) to unlock the guest's lockset.

In block 189, the guest may be provided with blank tokens 55 that the guest can encode with custom permissions. According to block 191, the guest may encode the blank tokens 55 using token encoder units 22 installed in the building or premises or, in one embodiment, through the lock controller 80 itself, assuming that it is equipped to act as a token encoder 22. The guest can distribute the guest-dispensed cards 55 to others (e.g., spouse, children) in their household, or to friends and other invitees.

In block 193, the guest uses the guest app 95 to send an LMS and/or smart home credential through email/text/chat, etc., and to selectively authorize what smart devices 42 and amenities the friend can access. After the user checks out or when the reservation is up, the LMS 11 disables the master LMS credential 70-72.

In an alternative embodiment incorporating blocks 178, 180, 182, and 196 (in substitution of blocks 177, 179 and supplementing blocks 181 and 195), LMS credentials 70 are issued, managed, and/or disabled independently of the SDC credentials 66. In block 178, SDC credentials 66 are issued to the guest, either electronically, on the same master token 50 that bears the LMS credential 70, or on a separate token. In block 180, the guest app 95 is configured to access the lockset 500, but not the smart devices 42, with the LMS credential 70. Instead, the guest app 95 directly controls the smart devices 42 using the SDC credential 66. When an LMS credential transfer occurs according to blocks 181, 183, 185, or 187, then in block 182, both the LMS credential 70 and the SDC credential 66 are transferred to the guest's smart phone 58.

Finally, when block 195's disabling of the master LMS credential is performed, in block 196, the SDC credential 66 is also disabled by either changing the credential remotely or by deleting or by replacing the smart device collection 45. Alternatively, in block 197, the LMS credential 70 and/or SDC credential 66 is disabled through use of a "block" card that is brought into proximity with the lockset 500. Or in block 198, another alternative, the LMS credential 70 and/or SDC credential 66 is disable via a disable command communicated to the lock controller 80 and/or smart devices 45 over Internet or LAN.

Each of the foregoing embodiments may either provide, or be extended to provide, one or more of the following features: (1) providing multiple tiers of tokens, e.g., administrative tokens that offer more control than regular guest keycards or key fobs; (2) the ability to remotely disable a keycard or key fob and thereby automatically disable any device associated with keycard or key fob; (3) give guests a level of control over their lockset via an online app, while enabling central management to program what freedoms/features/controls the guest has power over; (4) enable app to control access to, and enable guests to consent to fees for, in-room and recreational amenities, such as a fridge, a pool, or a tennis court; (5) enable guests to issue a mobile key to a friend or visitor (third party) to enable others to temporarily access the locked room within a limited window of time or for one-time use; (6) provide the third party mobile with a token and/or credentials to allow temp or one-time access to room but not hotel amenities; (7) enable management or guests to use App or phone to issue or rescind a temporary PIN number for a third party to access room or amenities; and (8) provide a gateway to control the lockset via phone or a downloaded app, enabling landlords or management companies to remotely provide access to guests over Internet or via phone, while keeping the doors locked at other times.

The claims of this specification provide certain characterizations of the invention. Other characterizations of the invention, or other inventions set forth in this application, are contemplated for one or more continuation applications. For example, this specification provides support for a first continuation directed to a guest app that facilitates transfer of credential from a physical token issued to the guest to the guest's phone so guest can use phone to unlock unit.

In one embodiment, a method of providing a guest with access to a property and its smart appliances and devices using a mobile phone is provided. The guest is provided with a guest app for use on the mobile phone. Access to the property is restricted with a lock that is equipped to receive a code or credential and communicate with and be controlled by the guest app on the mobile phone. The guest is provided with a code or credential for accessing the property—in one implementation, a memorizable code entered into a lockset keypad, and in another implementation, a credential encoded onto a physical token such as a keycard or key fob. After the guest initially presents the code to the lock—either by entering it into the keypad or presenting the physical token—a lock-accessing LMS guest credential is transferred to the mobile phone. The lock accessing LMS guest credential is either the same code or credential initially provided to the guest, or a derivative thereof. Thereafter, the guest uses the guest app to unlock the lock.

Advantageously, the guest also uses the guest app to control or program smart devices that are in the property. In one implementation, when the smart devices are provided for and operated through a third-party smart device app that is not installed on the guest phone, the guest app provides a control that directs the mobile phone to a download link for a third-party smart device app. When the third-party smart device is installed, the guest app control launches the third-party smart device app. In another implementation, the guest app directly provides the guest with the ability to control and program the smart devices. The guest app does this by communicating directly with the smart devices through an Application Programming Interface (API) for the smart devices.

In another embodiment, a lock management system for an access-controlled property comprises one or more locks that are equipped with controllers that have at least one wireless communication means, one or more smart devices on or in the access-controlled property that each have a wireless communication means, and a guest app. The guest app, which is installable on a mobile phone, configures the phone for communicating with and controlling a lock, wherein the app is a program of instructions residing on a non-transitory computer medium. The guest app provides a first user control for unlocking the lock and a second user control for controlling or programming one or more of the smart devices.

In one implementation, the second user control launches a third-party app for controlling or programming the one or more smart devices. In another implementation, the guest app directly controls or programs the smart devices via an API or APIs for the one or more smart devices.

In a further implementation, the guest app is configured to provide a door-unlock credential to a lock to unlock the lock and provide the same credential or another credential to the one or more smart devices to control or program the one or more smart devices. Also, the smart devices are configured to be access-controlled so that the guest is prevented from controlling or programming the smart devices without presenting an appropriate credential.

In yet another implementation, the lock controllers are configured to receive an LMS guest credential from a keypad or a physical token that stores the LMS guest credential, and then to transfer the LMS guest credential or a derivative thereof to the mobile phone for use by the guest app.

Another method embodiment is disclosed that provides a guest with a mobile phone with access to not only a facility such as a lodging place or entertainment facility, but also one or more access-restricted amenities. Access to the facility is restricted using a lock having a lock controller that is equipped to communicate with a physical token and also equipped to wirelessly communicate with the guest's mobile phone. Also, access to the one or more amenities is restricted with one or more amenity controllers that are also equipped to wirelessly communicate with the guest's mobile phone. As part of or appurtenant to the process of checking a guest in, an LMS guest credential and one or more corresponding credential verification codes are generated. The LMS guest credential is loaded onto a token and given to the guest, along with directions for downloading an app to transfer the LMS guest credential or derivative thereof to the guest's mobile phone.

Meanwhile, the credential verification codes are sent to the facility and one or more access-restricted amenities. In one implementation, this is done via an interconnecting network. In another implementation, the credential verification codes are transferred to the appropriate lock and amenity controllers by the guests themselves. The lock and amenity controllers either store the credential verification codes as is or generate and store a derivative of the credential verification codes.

When a lock or amenity controller detects a match between the LMS guest credential or a derivative thereof and the corresponding credential verification code or a derivative thereof, the lock or controller grants access to the corresponding facility or amenity.

When the guest brings the token into proximity with or inserts the token into the lock, the LMS guest credential is transferred from the guest's token to the lock. When the guest, under the direction of the app, seeks to enable the mobile phone to operate the lock, the lock controller either transfers the LMS guest credential to the guest's mobile phone or generates a derivative thereof (e.g., by cryptographically signing it) and sending the derivative credential to the guest's mobile phone.

When the guest, while operating the app, relays a request to unlock the facility or one of the amenities using their phone, a number of actions follow. First, the phone sends the LMS guest credential or derivative thereof to the lock or amenity controller. Second, the lock or amenity controller processes the LMS guest credential or derivative thereof and the credential verification code or derivative thereof corresponding to the lock or amenity controller and determines if there is a match. Third, when the lock or amenity controller determines that there is a match, is provides access the facility or amenity by, for example, unlocking a lock, activating a switch, or providing a code needed to stream entertainment.

In various implementations, the lock controller communicates with the physical token through a card reader and/or a wireless communication means such as Bluetooth, WiFi, Bluetooth Low-Energy (BLE), Zigbee, Z-Wave, 6LoWPAN (a low-power wireless personal area network), near-field communications (NFC), WiFi Direct, GSM/GRPS (Global System for Mobile communications coupled with General Radio Packet Service), LTE (Long Term Evolution 4G wireless communications standard), LoRa (Long Range spread spectrum modulation technique derived from chirp spread spectrum (CSS) technology), NB-IoT (Narrow-Band Internet of Things), and RFID (radio-frequency identification). Also in various implementations, the lock controller and the amenity controllers communicate with the mobile phone through the RFID reader, the Bluetooth reader, direct WiFi (with the lock controller acting as an access point), or a wired connection to a WiFi gateway (which instead acts as the access point).

This specification also provides support for a second continuation directed to a lock controller configured to transfer a lock credential from a card to a guest's phone and to receive and respond to an unlock command from both a card and the guest's phone app, as well as to a whole system that enables this transfer.

In one embodiment, a method is disclosed of providing a guest with a mobile phone with access to a property. Access to the property is restricted by using a lock that is equipped to communicate with both a physical token and the guest's mobile phone. The token is optionally non-battery powered and optionally contains a passive RFID circuit. When checking the guest into the property (or otherwise providing the guest with access to the property), an LMS guest credential is loaded onto a token, which is given to the guest along with a guest app. The guest app enables the guest to transfer the LMS guest credential or a derivative credential (to be generated by the lock controller) to the guest's mobile phone. When the guest brings the token into proximity with or inserts the token into the lock, the LMS guest credential is transferred from the guest's token to the lock. When the guest, under the direction of the guest app, seeks to enable the mobile phone to operate the lock, transferring the LMS guest credential or the derivative credential to the guest's mobile phone. The guest phone may transmit either the LMS guest credential or derivative credential that it received from the lock controller, or a derivative thereof generated by the guest's mobile phone, back to the lock controller to unlock the door.

In one implementation, the LMS guest credential provides access to an amenity that is access-controlled through a controller equipped to read the LMS guest credential. Non-limiting examples of amenities include access-restricted or an access-controlled television, paid programming, computer, minibar, light, pool, gym, fitness center, bar, dining hall, dance hall, studio, conference room, theater, tennis court, or racquetball court.

In another implementation, the guest app enables the guest to invite a "friend" to have access to the room, facility, building and/or an amenity. This process is executed by the guest, using the guest app, inviting the friend; the friend, in response to the invitation, downloading a friend pass app; the friend pass app requesting that the guest app send it the LMS guest credential or a friend pass credential that is derived from the LMS guest credential; and the guest app sending the LMS guest credential or friend pass credential to the friend pass app. In yet another implementation, the guest app provides access to home automation features.

An embodiment of a lock management system (LMS) is provided controlling access to a room or facility using aspects of the methodologies mentioned above. The LMS comprises a lock with a lock controller. The lock controller is configured to receive a credential from a non-battery-powered physical token that, when authenticated, provides a guest with access to the lock controller. The lock controller is further configured to receive a request transmitted by a compatible mobile phone to gain a copy of the LMS guest credential or a derivative thereof, and to use the guest's physical token to authenticate the request. After the lock controller successfully authenticates the request, it transfers the LMS guest credential or derivative thereof to the mobile phone. Subsequently, when the guest uses the mobile phone to unlock the lock, the lock controller receives and examines the LMS guest credential or some derivative thereof from the mobile phone. If the LMS guest credential is valid, the lock controller unlocks the lock.

In one implementation, the LMS further comprises a guest app that enables a guest using the mobile phone and possessing the physical token to transmit the LMS guest credential or derivative credential from the lock controller to the mobile phone.

In another implementation, the LMS further comprises a lock management program (LMP) that remotely controls access to one or more accommodations, facilities, and/or amenities; generates LMS guest credentials and corresponding credential verification codes; causes the credential verification codes to be sent to corresponding lock and/or amenity controllers; and purges or disables the credential verification codes after the guest checks out. The LMP is configured to interact with any of several pre-existing commercially available property management system (PMS) application programming interfaces (APIs) that manage reservations, cancellations, and check-ins. The LMP's generation of LMS guest credentials and corresponding credential verification codes is coordinated with the PMS's management of check-ins and its purge of credential verification codes is coordinated with the PMS's management of check-outs.

In yet another implementation, the LMS is incorporated into an upgrade package for a PMS, and the LMS includes a plurality of lock controllers. In an alternative implementation, the LMS also comprises the PMS itself. That is, the LMS is a combination of property and lock management functions integrated into a common program.

A further implementation of the LMS comprises one or more amenity controllers that control access to an amenity in the room or facility or on the premises of the room or facility, wherein the amenity controller is configured to receive and authenticate the LMS guest credential or derivative thereof, and enable access to the amenity when the LMS guest credential or derivative thereof is authenticated and provided that the amenity has been paid for or provided to the guest as a feature of the accommodation.

In another embodiment, a lock management system (LMS) comprises a lock management program (LMP), a token encoder, an app, and one or more lock or amenity controllers. The LMP remotely controls access to one or more accommodations, facilities, and/or amenities. The LMP is configured to generate LMS guest credentials and corresponding credential verification codes. The LMS sends the credential verification codes to corresponding lock and/or amenity controllers.

The token encoder encodes the LMS guest credentials onto physical tokens for guests that enable them to access accommodations, facilities, and/or one or more of the amenities.

The app enables a guest using the mobile phone to obtain an LMS guest credential or derivative credential from a lock controller.

The amenity controllers are operable to receive a corresponding credential verification code from the central computer; read the LMS guest credentials from the physical tokens; transfer the LMS guest credential or derivative credential to a guest's mobile phone; receive the LMS guest credential or derivative credential from the guest's mobile phone; and analyze the LMS guest credential or derivative credential along with the corresponding credential verification code or a derivative code to determine whether there is a match indicating that the guest is to be provided with access to the locked or access-controlled accommodation, facility, and/or amenity.

Having thus described exemplary embodiments of the present invention, it should be noted that the disclosures contained in the drawings are exemplary only, and that various other alternatives, adaptations, and modifications can be made within the scope of the present invention. This includes systems and methods that combine features of one embodiment with features of another embodiment. The invention is also not limited by the order in which flow chart actions are presented or explained, unless for claims in which the order is explicitly set forth. Accordingly, the present invention is not limited to the specific embodiments illustrated herein but is limited only by the following claims.

We claim:

1. An integrated lock management and smart device control system comprising:
   a lock management system (LMS) that issues, manages and centrally controls LMS credentials for a plurality of operating entryway locksets installed for a plurality of accommodations on a property, the LMS including a first program of instructions stored in a non-volatile medium that, when executed by a digital processor, provides an interface that provides a user-selectable command to generate an LMS credential to enable a guest to unlock an entryway to an accommodation on the property;
   a smart device collection (SDC) comprising one or more smart devices, other than lock controllers, on or in the accommodation or a premises of the accommodation, the smart devices being controllable, schedulable, and/or configurable through use of a smart device credential or collection credential that is distinct from the LMS credential; and
   a smart device hub in communication with the SDC and configured to receive an LMS credential from a guest, the hub comprising a second program of instructions stored in a non-volatile medium that, when executed by a digital processor, configures the hub to receive a guest-issued, LMS-credential-backed smart device command that is directed to a selected one of the one or more SDC smart devices, and to respond to a successful authentication of the LMS credential by transmitting the command or a functional equivalent of the command, using the smart device credential or collection credential, to the selected smart device.

2. The integrated lock management and smart device control system of claim 1, further comprising a lock controller installed in a lockset that controls access to the entrance of the access-controlled property, wherein the hub is integrated into the lock controller.

3. The integrated lock management and smart device control system of claim 1, further comprising a first app, the first app comprising a third program of instructions stored in a non-transitory medium that, when executed on a mobile phone, provides the guest with commands to unlock the entrance to the access-controlled property and to turn the selected smart device on or off, schedule the selected smart device, and/or configure the selected smart device.

4. The integrated lock management and smart device control system of claim 3, wherein the first app provides selectable commands for generating LMS access tokens and/or LMS invitee credentials for invitees and/or household members of the guest.

5. The integrated lock management and smart device control system of claim 4, wherein the first app provides selectable commands for regulating access to the one or more smart devices by the invitees and/or household members of the guest.

6. The integrated lock management and smart device control system of claim 3, wherein the LMS further comprises a token encoder configured to encode a token with the LMS credential, the token encoder being communicatively coupled to the digital processor on which the first program is executed, so that the first program is operable to issue an instruction to the digital encoder to encode a token with the LMS credential.

7. The integrated lock management and smart device control system of claim 6, wherein the token or a sleeve for the token includes a scan code for downloading the first app.

8. The integrated lock management and smart device control system of claim 1, wherein the interface provided by the first program of instructions also provides a user-selectable command to disable the LMS credential to prevent further entry by the guest into the access-controlled property.

9. The integrated lock management and smart device control system of claim 1, further comprising a block card that bears a command, communicable to the lockset, to disable the LMS credential.

10. A method for integrating lock management and smart device control in a property having a plurality of guest accommodations equipped with remotely controllable entryway locks and furnished with one or more smart devices, other than lock controllers, the method comprising:
   in a lock management system (LMS) that issues and manages tokens provided to the guests for unlocking the entryways to the guest accommodations, issuing LMS credentials to the guests to access their respective accommodations;
   providing the guests with a guest app comprising a program of instructions stored in a non-transitory medium that, when executed, provides a first process for transferring their respective LMS credentials to their respective phones and a second process for controlling, scheduling, and/or programming a selected smart device on or in one of the guest accommodations, backed by their respective LMS credentials;

configuring a smart device hub to receive a guest-issued, LMS-credential-backed smart device command from the guest app, and to respond to a successful authentication of the LMS credential by transmitting the command or a functional equivalent of the command, using a smart device credential that is distinct from the LMS credential, to the selected smart device.

11. The method of claim 10, wherein the guest app provides selectable commands to unlock the entrance to the guest's accommodation and to turn the selected smart device on or off, schedule the selected smart device, and/or configure the selected smart device.

12. The method of claim 11, wherein the guest app also provides selectable commands for generating LMS access tokens and/or LMS invitee credentials for invitees and/or household members of the guest.

13. The method of claim 12, wherein the guest app provides selectable commands for regulating access to the one or more smart devices by the invitees and/or household members of the guest.

14. The method of claim 10, further comprising disabling the LMS credential to prevent not only further entry by the guest into the access-controlled property, but also further access to the smart devices.

15. A system that enables a guest to control both an accommodation entrance lock and smart devices installed in or on the accommodation using two independently configured credentials, the system comprising:

a lock controller configured to:

store a smart device collection credential needed to control the smart devices installed in or on the accommodation;

communicate remotely with and be administratively configured through a lock management system (LMS) that issues, manages and centrally controls LMS guest credentials for a plurality of entryway locks installed for a plurality of accommodations on a property;

receive lock and unlock commands from guest smart phones and comply with them when the commands are backed by a valid LMS guest credential;

receive smart device commands to control, schedule, and/or configure a selected smart device from said guest smart phones that are accompanied by a valid LMS guest credential or an authenticatable derivative thereof; and authenticate the LMS guest credential or a derivative thereof and responsively issue a second command, using the smart device collection credential, to the selected smart device.

16. The system of claim 15, further comprising:

a smart phone guest app that enables a guest, during a valid term of their accommodation, to lock and unlock the entrance lock to their accommodation using an LMS guest credential and to also control the smart devices installed in or on the accommodation using their LMS guest credential;

wherein the LMS gives an administrator control over the operation of the lock controllers, including whether to recognize a given LMS credential, but provides the administrator much more limited control of the smart devices installed in or on the accommodation than the guest.

* * * * *

UNITED STATES PATENT AND TRADEMARK OFFICE
CERTIFICATE OF CORRECTION

PATENT NO. : 11,120,657 B2  
APPLICATION NO. : 16/568641  
DATED : September 14, 2021  
INVENTOR(S) : Ma et al.

Page 1 of 1

It is certified that error appears in the above-identified patent and that said Letters Patent is hereby corrected as shown below:

In the Drawings

In Fig. 20, Sheet 12 of 18, delete "Record Entries/Attmps" and insert -- Record Entries/Attempts --, therefor.

In Fig. 21, Sheet 12 of 18, delete "Record Entries/Attmps" and insert -- Record Entries/Attempts --, therefor.

Figure 24:
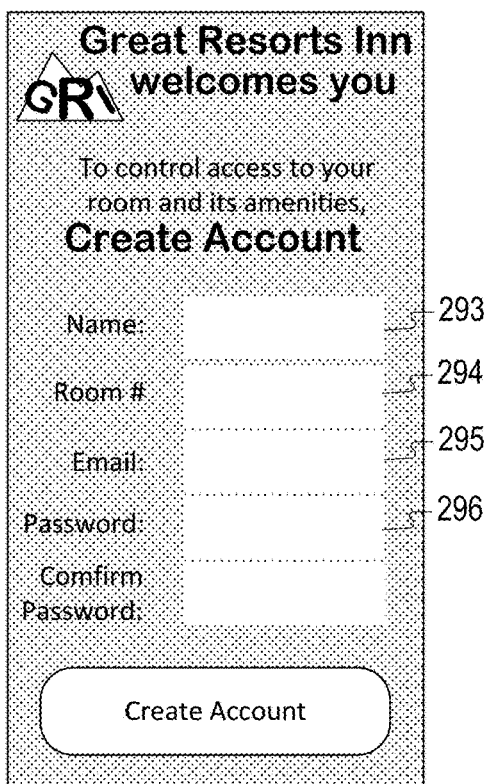
FIG. 24 illustrates a login screen of one embodiment of a guest app for opening locks, accessing amenities, programming home-automation devices, and inviting friends.
Figure 25:
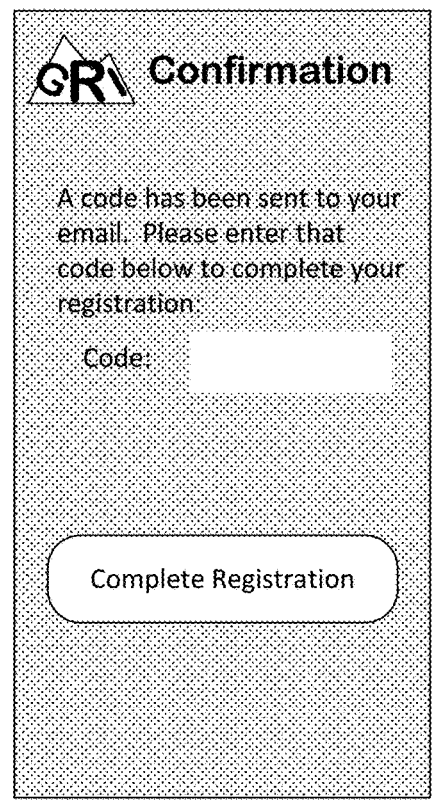
FIG. 25 illustrates a secondary authentication screen of the guest app.

In Fig. 24, Sheet 13 of 18, delete "Comfirm" and insert -- Confirm --, therefor.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*